(12) United States Patent
Wang et al.

(10) Patent No.: US 12,047,941 B2
(45) Date of Patent: Jul. 23, 2024

(54) DOWNLINK RELAY FOR PASSIVE INTERNET OF THINGS COMMUNICATION

(71) Applicant: QUALCOMM Incorporated, San Diego, CA (US)

(72) Inventors: Xiaojie Wang, Hillsborough, NJ (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/657,421

(22) Filed: Mar. 31, 2022

(65) Prior Publication Data

US 2023/0319814 A1    Oct. 5, 2023

(51) Int. Cl.
| | |
|---|---|
| *H04W 72/1263* | (2023.01) |
| *H04L 1/00* | (2006.01) |
| *H04L 5/00* | (2006.01) |
| *H04W 72/044* | (2023.01) |
| *H04W 72/20* | (2023.01) |
| *H04W 72/51* | (2023.01) |
| H04W 88/04 | (2009.01) |

(52) U.S. Cl.
CPC ....... *H04W 72/1263* (2013.01); *H04L 1/0003* (2013.01); *H04L 5/0044* (2013.01); *H04W 72/0473* (2013.01); *H04W 72/20* (2023.01); *H04W 72/51* (2023.01); *H04W 88/04* (2013.01)

(58) Field of Classification Search
CPC . H04W 72/1263; H04W 72/51; H04W 72/20; H04W 72/0473; H04W 88/04; H04L 1/0003; H04L 5/0044
See application file for complete search history.

(56) References Cited

U.S. PATENT DOCUMENTS

| | | | |
|---|---|---|---|
| 2019/0140731 A1 | 5/2019 | Mohan et al. | |
| 2020/0053802 A1* | 2/2020 | Li | H04W 12/06 |
| 2022/0346022 A1* | 10/2022 | Butt | H04W 52/0251 |
| 2023/0013067 A1* | 1/2023 | Liu | H04W 40/22 |

(Continued)

OTHER PUBLICATIONS

China Mobile, et al., "The Discussion on the Motivation of Passive IoT" 3GPP TSG-SA WG2 Meeting #148E, S2-2108543, 3rd Generation Partnership Project, Mobile Competence Centre, 650, Route Des Lucioles, F-06921 Sophia-Antipolis Cedex, France, vol. SA WG2, No. E (e-meeting), Nov. 15, 2021-Nov. 22, 2021, Nov. 8, 2021, XP052075676, pp. 1-11.

(Continued)

*Primary Examiner* — Ajay Cattungal
(74) *Attorney, Agent, or Firm* — Patterson + Sheridan, LLP

(57) ABSTRACT

Certain aspects of the present disclosure provide techniques for downlink relaying for passive internet of things (PIoT) communication. An example method includes receiving, from a network entity in a wireless network, configuration information for communicating with at least one passive internet of things (PIoT) device and receiving, from the network entity, a PIoT message, the PIoT message including at least a PIoT relay command instructing the UE to communicate with the at least one PIoT device. The method also includes transmitting, based on the PIoT message, one or more signals to the at least one PIoT device in accordance with the configuration information.

32 Claims, 15 Drawing Sheets

(56) References Cited

U.S. PATENT DOCUMENTS

2023/0189050 A1* 6/2023 Rao ................. H04L 47/283
　　　　　　　　　　　　　　　　　　　　 370/231

OTHER PUBLICATIONS

International Search Report and Written Opinion—PCT/US2023/064882—ISA/EPO—Sep. 28, 2023.
Uyoata U., et al., "Relaying in the Internet of Things (IoT) : A Survey", IEEE Access, IEEE, USA, vol. 9, Sep. 17, 2021, XP011880804, pp. 132675-132704, Sections I, I.A, II.B-II.D, III.A, figures 1-7.
Vodafone, et al., "Initial Requirements for Passive IoT", 3GPP TSG-SA1 Meeting #96e, S1-214145, 3rd Generation Partnership Project, Mobile Competence Centre, 650, Route Des Lucioles, F-06921 Sophia-Antipolis Cedex, France, vol. SA WG1, No. Electronic Meeting, Nov. 8, 2021-Nov. 18, 2021, Oct. 29, 2021, XP052072673, 2 pages.

* cited by examiner

US 12,047,941 B2

DOWNLINK RELAY FOR PASSIVE INTERNET OF THINGS COMMUNICATION

BACKGROUND

Field of the Disclosure

Aspects of the present disclosure relate to wireless communications, and more particularly, to techniques for downlink relaying for passive internet of things (PIoT) communication.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving, from a network entity in a wireless network, configuration information for communicating with at least one passive internet of things (PIoT) device. The method further includes receiving, from the network entity, a PIoT message, the PIoT message including at least a PIoT relay command instructing the UE to communicate with the at least one PIoT device. The method further includes transmitting, based on the PIoT message, one or more signals to the at least one PIoT device in accordance with the configuration information.

One aspect provides a method for wireless communication by a network entity. The method includes outputting, for transmission to a user equipment (UE) in a wireless network, configuration information for communicating with at least one passive internet of things (PIoT) device. The method further includes outputting, for transmission to the UE, a PIoT message, the PIoT message including at least a PIoT relay command instructing the UE to communicate with the at least one PIoT device. The method further includes obtaining response information from the at least one PIoT device based on the PIoT message.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
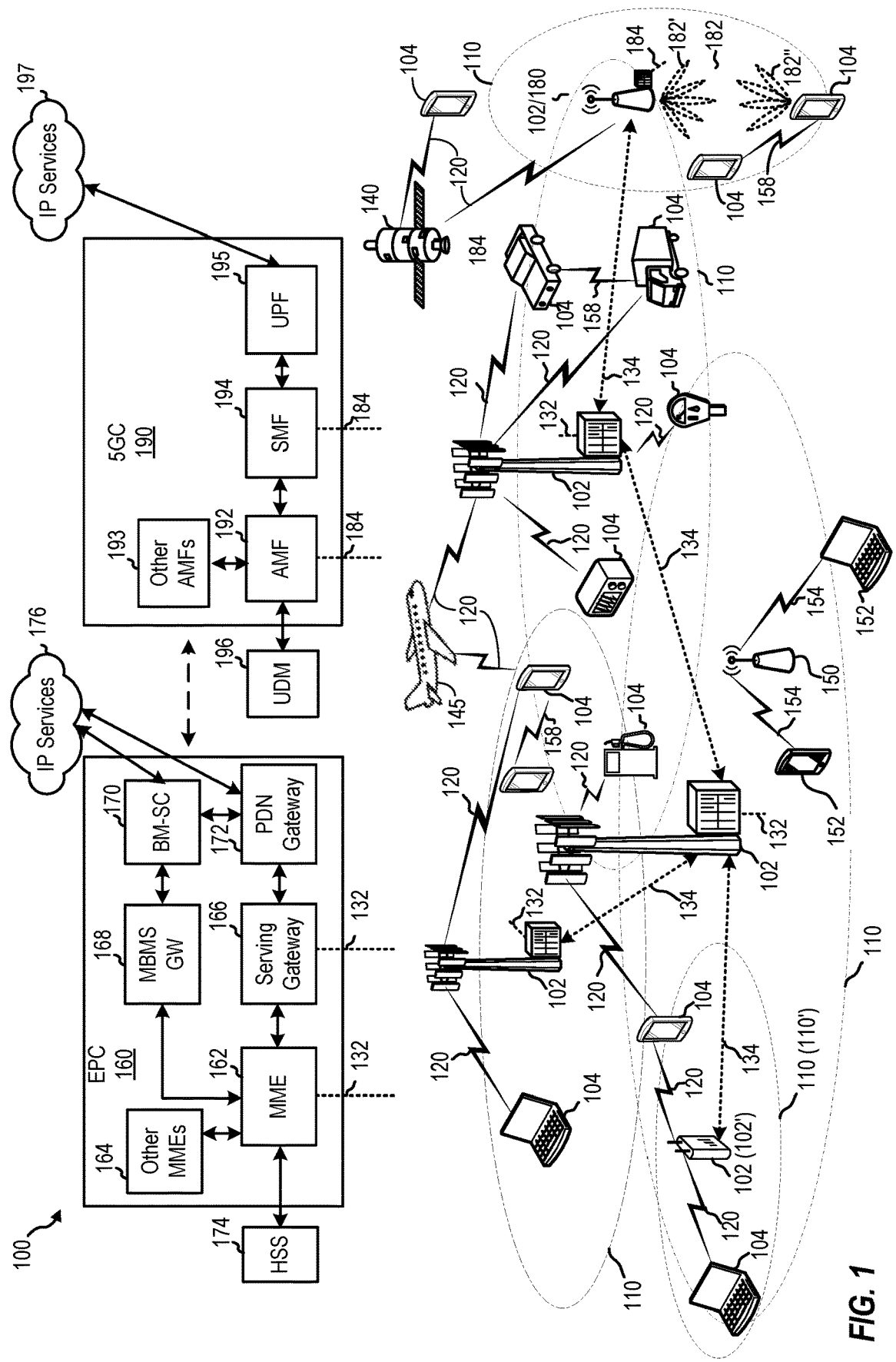
FIG. 1 depicts an example wireless communications network.

Aspects of the present disclosure provide apparatuses, methods, processing systems, and computer-readable mediums for downlink relaying for PIoT communication.

Radio frequency identification (RFID) is a rapidly growing technology impacting many industries due to its economic potential for inventory/asset management within warehouses, IoT, sustainable sensor networks in factories and/or agriculture, and smart homes. RFID technology consists of small transponders, or tags, that emit an information-bearing signal upon receiving an energizing signal. RFIDs may be operated without battery at low operating expense, low maintenance cost, and long-life cycle. These type of RFIDs are known as passive RFIDs. Passive RFIDs operate by harvesting energy over the air, powering transmission/reception circuitry within the RFIDs. This harvested energy allows passive RFIDs to transmit information, sometimes referred to as backscatter modulated information, without the need for a local power source within the RFID.

PIoT is similar to RFID technology in that PIoT devices do not include a local power source. Instead, PIoT devices may harvest energy from radio signals emitted from a network entity in a wireless communication network for performing data collection, transmission and distributed computing. For example, a network entity, such as a base station, may provide an energy signal to passive IoT devices and, in turn, information-bearing signals from the PIoT devices sent to and received by the network entity. The network entity may then decode the received signals to obtain information transmitted by the PIoT devices within the reflected signal.

However, such communication between a network entity and a PIoT device may only be supported for relatively short distances (e.g., less than 10 meters) due to insufficient link budget issues associated transmission of the energy signal. For example, energy/power harvesting circuitry within PIoT devices typically needs a relatively high input power (e.g., −13 dBm). However, due to the nature of cellular network topography, there is no guarantee that the network entity will be located sufficiently close to the PIoT device to be able to provide the relatively high input power. Moreover, due to regulatory limits, a network entity is limited regarding an amount of transmission power that may be used for transmitting the energy signal. As a result, in some cases, due to the regulatory limits and distance between the network entity and the PIoT device, an energy signal transmitted by the network entity may not be sufficient to power the PIoT device.

Accordingly, aspects of the present disclosure provide techniques to overcome the technical problems described above with respect to PIoT communication between a network entity and a PIoT device, such as when the network entity is located too far away from the PIoT device to transmit an adequate energy signal to power the PIoT device. Aspects described herein may involve using one or more relay devices, located closer to the PIoT device, to transmit an energy signal sufficient to power the PIoT device. Thus, such relay devices can overcome the technical limitation of distance and transmission power restrictions by transmitting an energy signal in closer proximity to the PIoT device.

In some cases, the one or more relay devices may be configured to transmit the energy signal to power the PIoT device while a network entity performs active PIoT communication with the PIoT device (e.g., generating and transmitting one or more PIoT commands and receiving one or more responses). In other cases, the one or more relay devices may be configured to transmit the energy signal to the PIoT device and also to facilitate the active PIoT communication with the PIoT device (e.g., the one or more relay devices locally generates and transmits the PIoT commands to the PIoT device for the network entity).

By using the one or more relay devices to transmit the energy signal to power the PIoT device, PIoT communication between the network entity and the PIoT device may be facilitated at greater distances (e.g., even when the network entity is out of effective range of the PIoT device). Moreover, these techniques help to avoid wasted time, frequency, and power resources when communications are attempted with a PIoT device that is located too far from the network entity to receive sufficient operating power with which to receive and respond to such communications.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
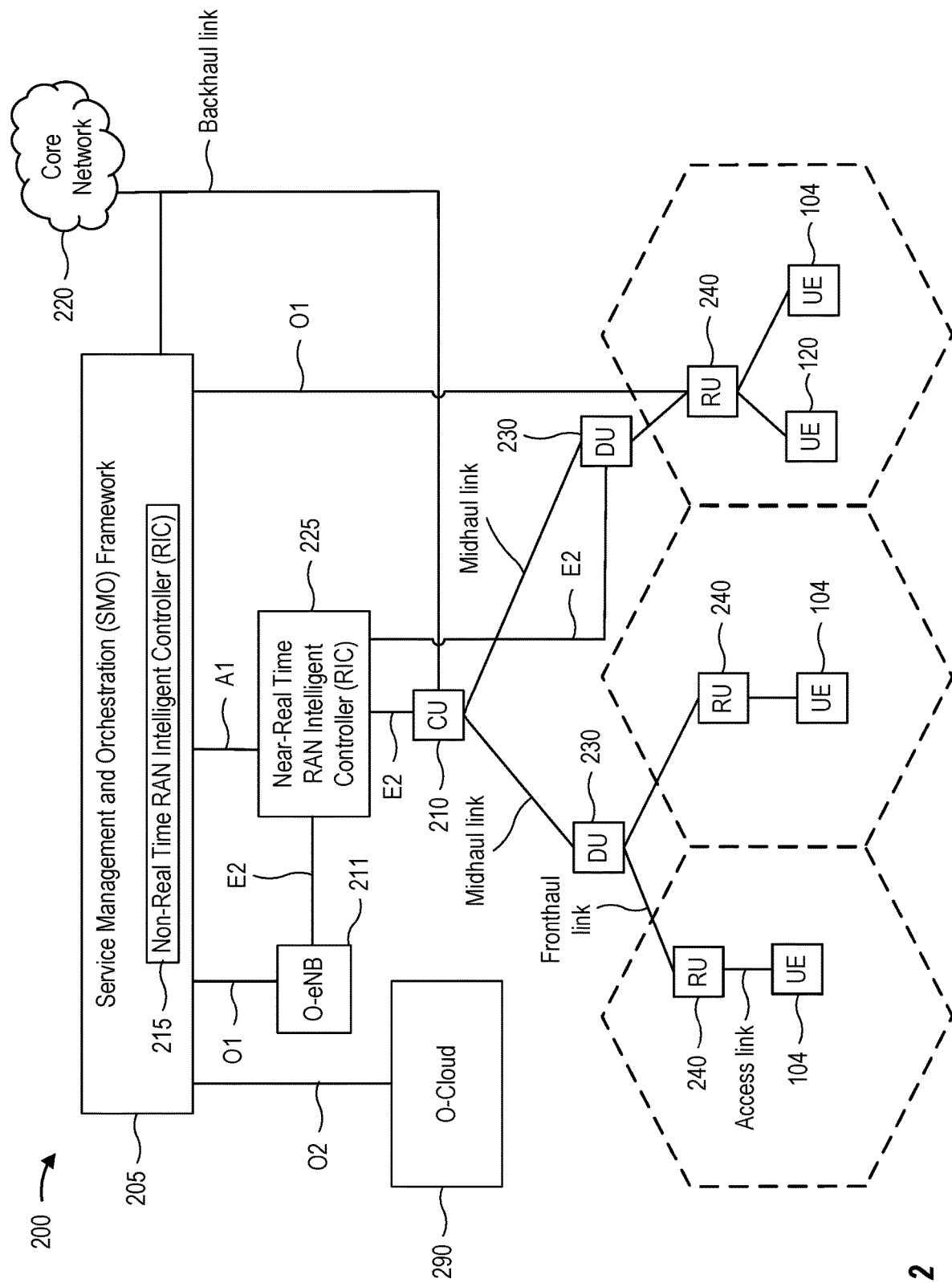
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the base station 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
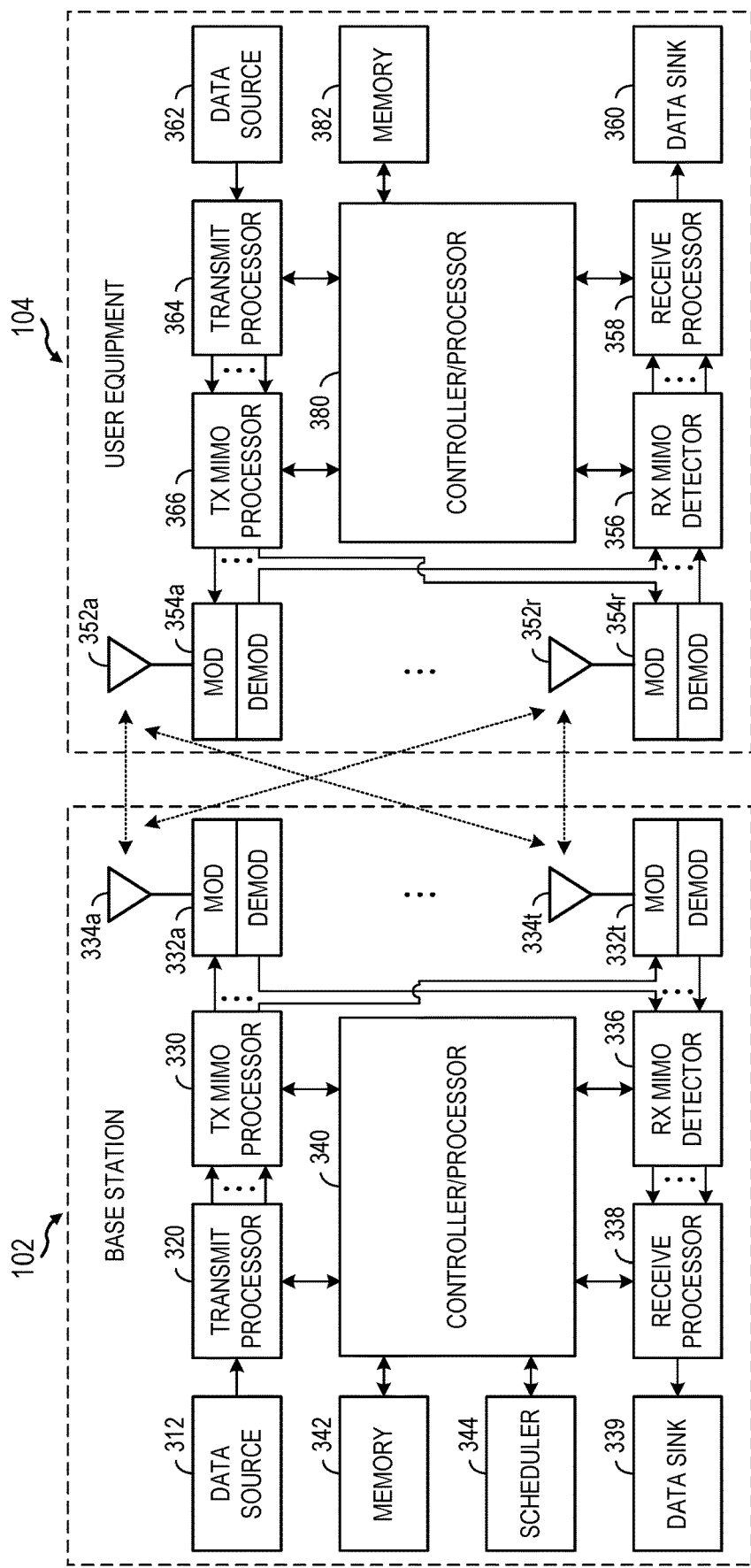
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
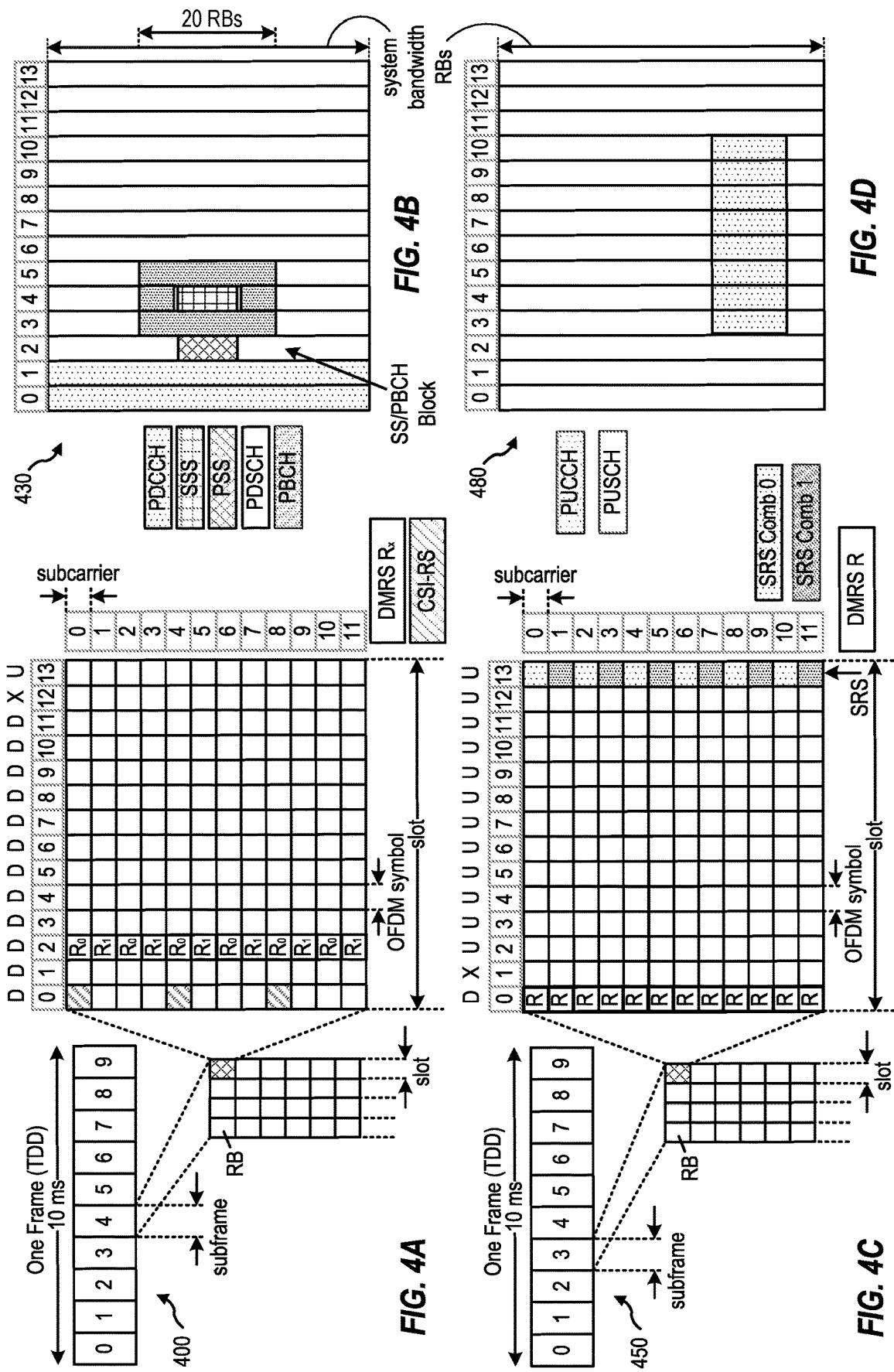
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Radio Frequency Identification Systems

Figure 5:
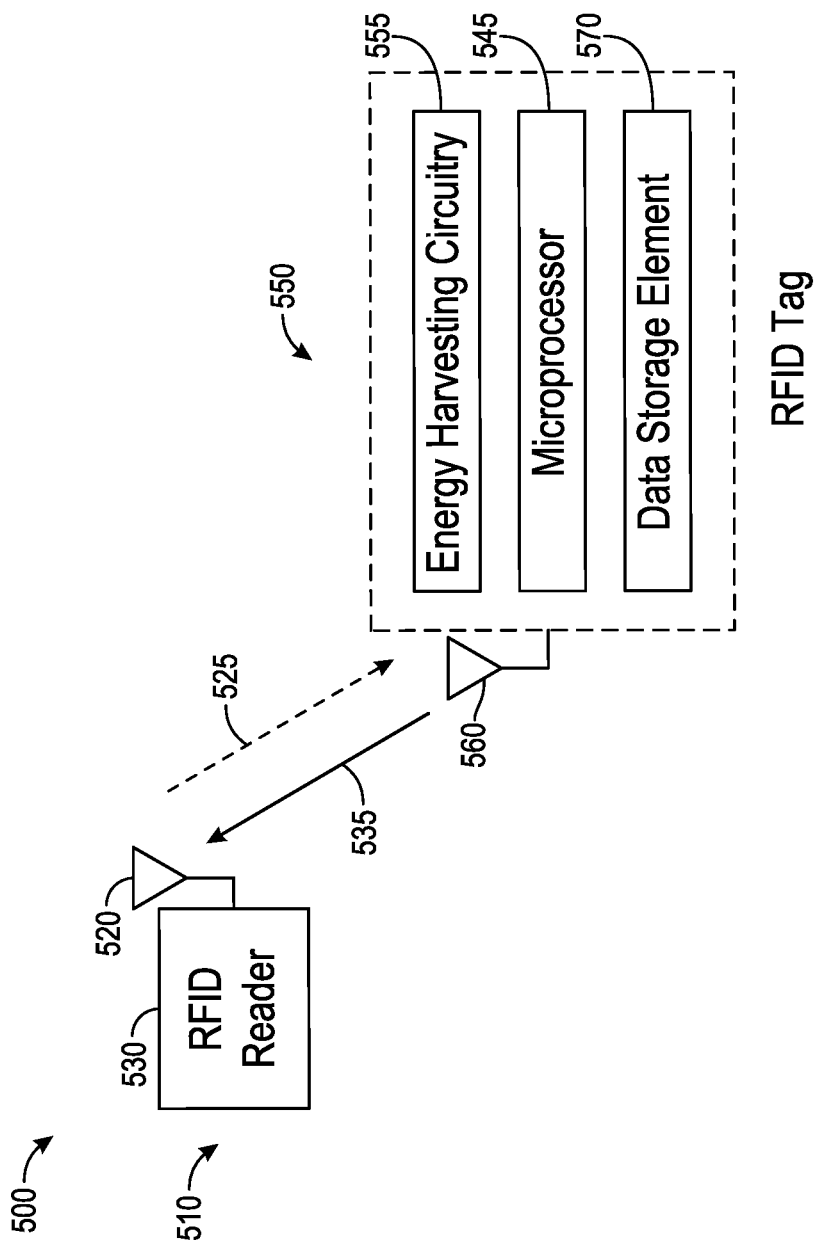
FIG. 5 illustrates a radio frequency identification (RFID) system.

FIG. 5 shows a radio frequency identification (RFID) system 100. As shown, the RFID system 100 includes an RFID reader 510 and an RFID tag 550. The RFID reader 510 may also be referred to as an interrogator or a scanner. The RFID tag 550 may also be referred to as an RFID label or an electronics label.

The RFID reader 510 includes an antenna 520 and an electronics unit 530. The antenna 520 radiates signals transmitted by the RFID reader 510 and receives signals from RFID tags and/or other devices. The electronics unit 530 may include a transmitter and a receiver for reading RFID tags such as the RFID tag 550. The same pair of transmitter and receiver (or another pair of transmitter and receiver) may support bi-directional communication with wireless networks, wireless devices, etc. The electronics unit 530 may include processing circuitry (e.g., a processor) to perform processing for data being transmitted and received by the RFID reader 510.

As shown, the RFID tag 550 includes an antenna 560 and a data storage element 570. The antenna 560 radiates signals transmitted by the RFID tag 550 and receives signals from the RFID reader 510 and/or other devices. The data storage element 570 stores information for the RFID tag 550, for example, in an electrically erasable programmable read-only memory (EEPROM) or another type of memory. The RFID tag 550 may also include an electronics unit that can process the received signal and generate the signals to be transmitted. The RFID tag 550 may be a passive RFID tag having no battery. In this case, induction may be used to power the RFID tag 550. For example, in some cases, a magnetic field from a signal transmitted by RFID reader 510 may induce an electrical current in RFID tag 550, which may then operate based on the induced current. The RFID tag 550 can radiate its signal in response to receiving a signal from the RFID reader 510 or some other device.

In one example, the RFID tag 550 may be read by placing the RFID reader 510 within close proximity to the RFID tag 550. The RFID reader 510 may radiate a first signal 525 via the antenna 520. In some cases, the first signal 525 may be known as an interrogation signal or energy signal. In some cases, energy of the first signal 525 may be coupled from the RFID reader antenna 520 to RFID tag antenna 560 via magnetic coupling and/or other phenomena. In other words, the RFID tag 550 may receive the first signal 525 from RFID reader 510 via antenna 560 and energy of the first signal 525 may be harvested using energy harvesting circuitry 555 (e.g., an RF transducer) and used to power the RFID tag 550. For example, energy of the first signal 525 received by the RFID tag 550 may be used to power a microprocessor 545 of the RFID tag 550. The microprocessor 545 may, in turn, retrieve information stored in a data storage element 570 of the RFID tag 550 and transmit the retrieved information via a second signal 535 using the antenna 560. For example, in some cases, the microprocessor 545 may generate the second signal 535 by modulating a baseband signal (e.g., generated using energy of the first signal 525) with the information retrieved from the data storage element 570. In some cases, this second signal 535 may be known as a backscatter modulated information signal. Thereafter, as noted, microprocessor 545 transmits the second signal 535 to the RFID reader 510. The RFID reader 510 may receive the second signal 535 from the RFID tag 550 via antenna 520 and may process (e.g., demodulate) the received signal to obtain the information of the data storage element 570 sent in the second signal 535.

In some cases, the RFID system 500 may be designed to operate at 13.56 MHz or some other frequency (e.g., an ultra-high frequency (UHF) band at 900 MHz). The RFID reader 510 may have a specified maximum transmit power level, which may be imposed by the Federal Communication Commission (FCC) in the United Stated or other regulatory bodies in other countries. The specified maximum transmit power level of the RFID reader 510 may limit the distance at which RFID tag 550 can be read by RFID reader 510.

Aspects Related to Downlink Relaying for Passive Internet of Things Communication Fifth generation (5G) wireless technology has been expanded to more industrial applications, such as ultra-reliable low-latency communication (URLLC) and machine type communication (MTC). In the future, 5G may be expanded to support passive internet of things (PIoT) devices. PIoT devices may employ RFID-type technology and, as such, may not include a local power source. Instead, PIoT devices may harvest energy from radio signals emitted from a network entity for performing data collection, transmission and distributed computing. 5G wireless standards bodies have developed specifications to support narrow band IoT (NB-IoT)/MTC devices and reduced capability (RedCap) devices for MTC use cases. RedCap-type devices may be associated with a reduced operating bandwidth, a reduced maximum number of MIMO layers, and a relaxation of a maximum downlink modulation order. However, while current 5G technology is able to support the NB-IoT and RedCap devices, this technology may not be able to efficiently support the most pervasive RFID-type of sensors (e.g., passive IoT devices) in many future use cases, such as asset management, logistics, warehousing and manufacturing. For example, supporting PIoT devices using current 5G technology would require these PIoT devices to have more complex circuitry, requiring additional cost and maintenance associated with battery replacement, which may not be feasible in these future use cases.

As such, additional wireless communication technology may be necessary to manage communication with PIoT-type devices. For example, to support PIoT communication, certain network entities (e.g., a base station or one or more components of a base station) may be capable of providing energy to the passive IoT devices and, in turn, receiving information-bearing signals from the PIoT devices based on the provided energy. The network entity may then decode the information-bearing signals to obtain information transmitted by the PIoT devices within these signals.

Figure 6:
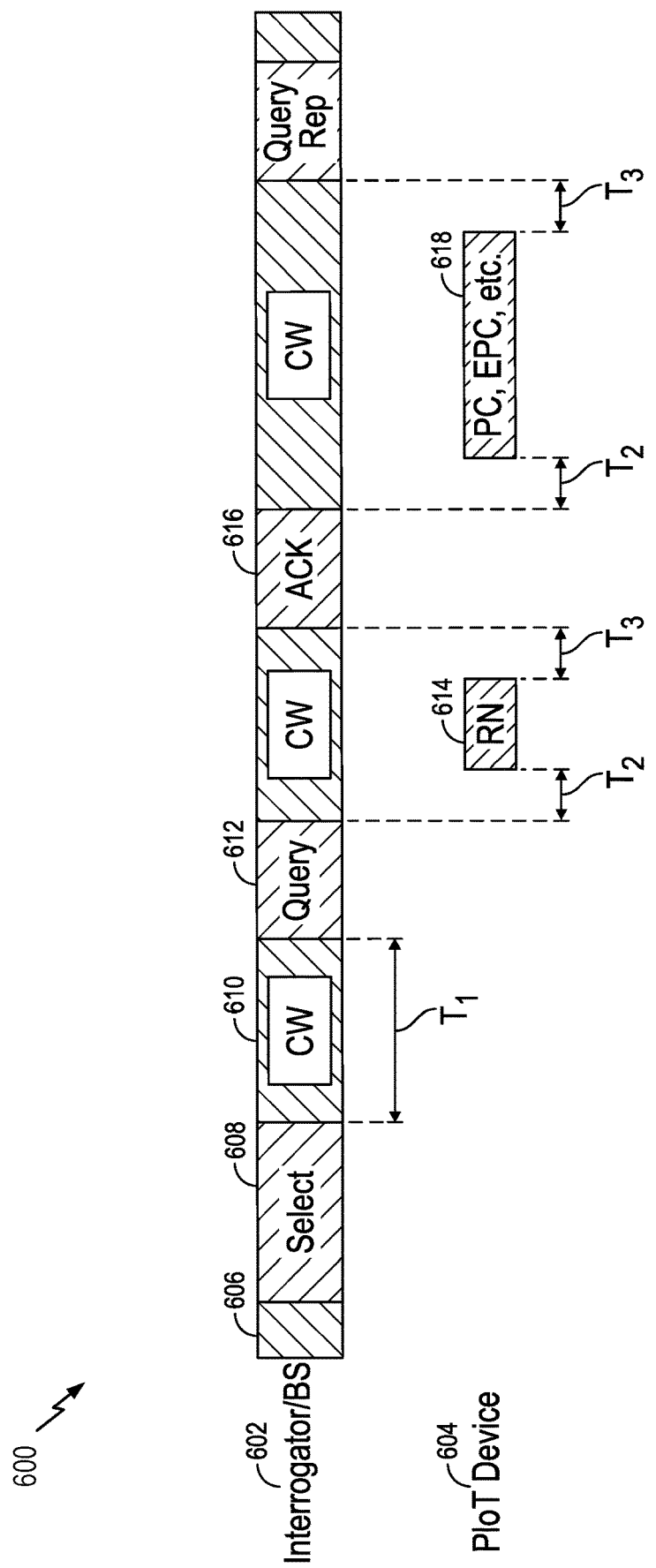
FIG. 6 includes an example timeline illustrating communication between a network entity and a PIoT device for reading information stored in the PIoT device.

FIG. 6 includes an example timeline 600 illustrating communication between a network entity 602 (e.g., a base station or interrogator) and a PIoT device 604 (e.g., an RFID tag), for example, for reading information stored in the PIoT device 604.

As shown, the network entity 602 transmits a continuous wave (CW) energy signal as shown at 606 to trigger backscatter modulated transmission by the PIoT device 604. The CW energy signal may be received by the PIoT device 604 and used to power one or more electrical components of the PIoT device 604. In general, the network entity 602 may continuously transmit the CW energy signal during the timeline 600 to keep the PIoT device 604 powered on.

Thereafter, once the PIoT device 604 is powered on, the network entity 602 transmits a first PIoT command message to the PIoT device 604 by modulating the CW energy signal with information within the first PIoT command message. In some cases, as shown at 608, the first PIoT command message transmitted at 608 may comprise a "select" command, indicating a PIoT device population selected for inventory operations or to authenticate a PIoT device population. Other PIoT command messages may include an "inventory" command indicating one or more identified PIoT devices that are being queried for inventory or an "access" command for communicating with an identified PIoT device for reading, writing, locking and killing certain memory in the PIoT device. These are just some examples, and others are possible.

After transmitting the first PIoT command (e.g., the select command) at 608, the network entity 602 may continue to transmit the CW energy signal as shown at 610 to keep the PIoT device powered on. As shown, at 612, the network entity 602 transmits a second PIoT command message, such as a query message (e.g., an inventory command), by modulating the CW energy signal with information in the second PIoT command message. In some cases, the period of time between transmission of the first PIoT command message and the second PIoT command message is denoted $T_1$ and is a minimum time gap between two downlink messages (e.g., messages transmitted from the network entity 602 to the PIoT device 604). In some cases, $T_1$ may be provisioned to allow the PIoT device 604 to harvest power from the CW energy signal. Typically, this $T_1$ may be provisioned according to capability of the PIoT device 604. For a worst case (e.g., considering a lowest capability), $T_1$ may depend on a message size and complexity of logic of the PIoT device 604 (e.g., processing/computing/reading memory, etc.). In some cases, $T_1$ may range between 0.5 ms to 2 ms.

The PIoT device 604 may receive and process the second PIoT command message. Thereafter, as shown at 614, the PIoT device 604 responds to the network entity 602 by transmitting a registered identification number (RN) message. As shown, a time period between reception of the second PIoT command message and transmission of the RN message is denoted $T_2$, which is within a specified range of $T_{2,min}$ and $T_{2,max}$. In some cases, $T_{2,min}$ and $T_{2,max}$ may account for propagation delay between the network entity 602 and PIoT device 604, a voltage drop at the PIoT device 604 due to decoding/computing, and also a required processing time at the PIoT device 604. As such, $T_2$ may range between $T_{2,min}$ and $T_{2,max}$ and may depend on the distance between network entity 602 and PIoT device 604 and also on a capability of the PIoT device 604 to decode, process, and respond to the second PIoT command message. In some cases, $T_{2,min}$ may range between 0.5-1 ms and $T_{2,max}$ may range between 2-5 ms.

Thereafter, at 616, the network entity 602 transmits an acknowledgement (ACK) message to the PIoT device, acknowledging reception of the RN message. As shown, a time period between reception of the RN message by the network entity 602 and transmission of the ACK message is denoted $T_3$, which is within a specified range of $T_{3,min}$ and $T_{3,max}$. In some cases, a length of the time periods $T_2$ and $T_3$ may depend on and may be different for different message types (e.g., query, query adjust, lock, authenticate, etc.). In some cases, $T_3$ may be similar to $T_2$ or a fraction of $T_2$ (e.g., $0.5*T_2$).

Thereafter, as shown at 618, in response to receiving the ACK message, the PIoT device transmits, to the network entity 602, additional information stored in memory of the PIoT device 604, such a protocol code (PC), an electronic product code (EPC), or the like.

While FIG. 6 illustrates communication between a network entity, such as a base station, and a PIoT device, issues may exist with facilitating such communication. For example, communication between the network entity 602 and the PIoT device 604 may only be supported for relatively short distances (e.g., less than 10 meters) due to insufficient link budget issues associated with a power link (e.g., a communication link used for transmitting the energy signal for powering PIoT devices). For example, energy harvesting circuitry the PIoT device 604 typically needs a relatively high input power (e.g., −13 dBm). However, there is no guarantee that the network entity 602 (e.g., a base station) will be located sufficiently close to the PIoT device 604 to be able to provide the necessary high input power. In some cases, if the network entity 602 were to proceed ahead with attempting to communicate with the PIoT device 604 at greater distances (e.g., greater than 10 meters), the energy signal transmitted by the network entity 602 may not be sufficient to power the PIoT device 604 on, resulting in the PIoT device 604 not receiving transmissions from the network entity 602 and, ultimately, resources used for transmitting these transmissions (e.g., time, frequency, and power resources) being wasted.

Further, when the network entity 602 is located further away (e.g., greater than 10 meters) from the PIoT device 604, the network entity 602 may not simply increase a transmission power of the energy signal to compensate for the greater distance due to regulatory limitations. Additionally, lower input powers associated with greater distances, such as −20 dBm or below, may not be able to ensure satisfactory cost and conversion efficiency (e.g., below 1%). For example, when an input power to energy harvesting circuitry drops, an efficiency of wireless power transfer decreases (e.g., to 1%), making the harvested power insufficient to turn on the PIoT device 604. Moreover, reflections due to multi-path scenarios can also cause fading of the energy signal transmitted by the network entity 602, degrading an effective range of the energy signal.

Accordingly, aspects of the present disclosure provide techniques to overcome the technical problems described above with respect to PIoT communication between a network entity and a PIoT device. In some cases, the techniques presented herein may be applicable to scenarios in which the network entity is located too far away from the PIoT device to transmit an adequate energy signal to power the PIoT device. Aspects described herein may involve using one or more relay devices (e.g., a normal user equipment, a repeater, or RedCap devices), located closer to the PIoT device, to transmit an energy signal used to power the PIoT device. Thus, such relay devices can overcome the technical limitation of distance and transmission power restrictions by transmitting an energy signal in closer proximity to the PIoT device.

In some cases, the one or more relay devices may be configured to transmit the energy signal to power the PIoT device while a network entity performs active PIoT communication with the PIoT device (e.g., generating and transmitting one or more PIoT commands and receiving one or more responses). In other cases, the one or more relay devices may be configured to transmit the energy signal to the PIoT device and to facilitate the active PIoT communication with the PIoT device (e.g., the one or more relay devices locally generates and transmits the PIoT commands to the PIoT device for the network entity).

By using the one or more relay devices to transmit the energy signal to power the PIoT device, PIoT communication between the network entity and the PIoT device may be facilitated at greater distances (e.g., even when the network entity is out of effective range of the PIoT device). Moreover, these techniques help to avoid wasted time, frequency, and power resources when communications are attempted with a PIoT device that is located too far from the network entity to receive sufficient operating power with which to receive and respond to such communications.

Example Operations of Entities in a Communications Network

Figure 7:
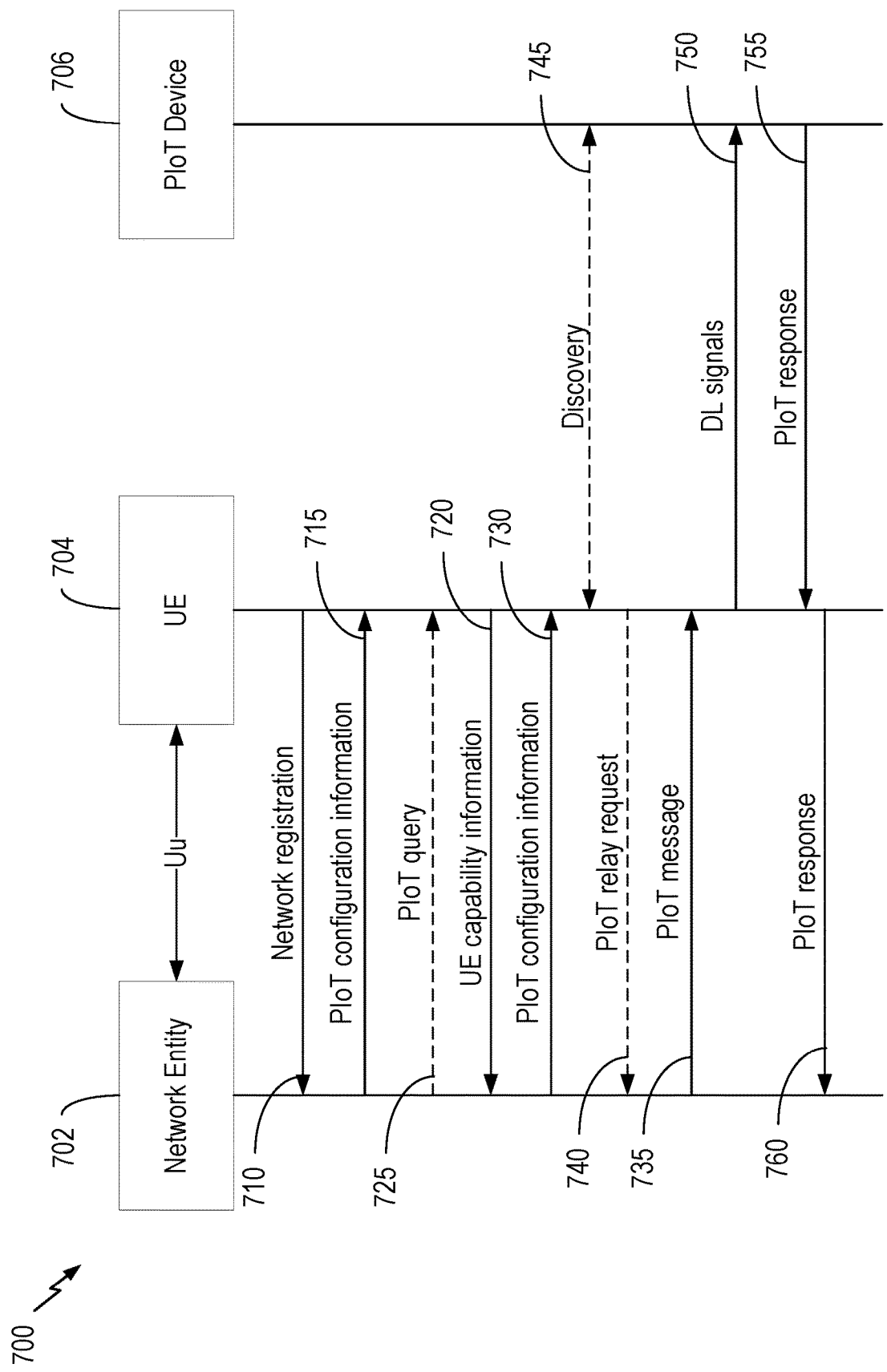
FIG. 7 depicts a process flow for communications in a network between a network entity and a user equipment.

FIG. 7 depicts example operations 700 for communications in a network between a network entity 702, a UE 704, and a PIoT device 706 in a wireless network. In some cases, as will be explained below, the network entity 702 and UE 704 may be configured to perform similar techniques as an interrogator, such as the RFID reader 510 depicted and described with respect to FIG. 5, for reading information stored in memory of the PIoT device 706.

In some aspects, the network entity 702 may be an example of the BS 102 depicted and described with respect to FIGS. 1 and 3 or a disaggregated base station depicted and described with respect to FIG. 2. In some cases, the UE 704 may be an example of UE 104 depicted and described with respect to FIGS. 1 and 3. In some cases, the UE 704 may be another type of device, such as a repeater or a RedCap device. In some cases, the PIoT device may be an example of the RFID tag 550 depicted and described with respect to FIG. 5.

As shown, operations 700 begin in step 710 with the UE 704 performing a registration procedure with the network entity 702 to register with the wireless network. In some cases, the registration procedure may include, for example, a random access channel (RACH) procedure.

Thereafter, as shown in step 715, the UE 704 receives, from the network entity 702, configuration information for communicating with the PIoT device 706. The configuration information may include one or more parameters for communicating with the at least one PIoT device. For example, in some cases, the configuration information may include a type of deployment associated with communicating with the PIoT device 706 in the wireless network.

Figure 8C:
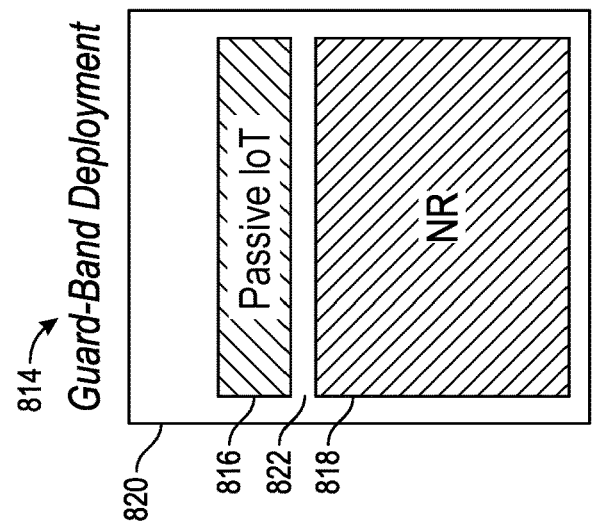
FIGS. 8A, 8B, and 8C illustrate different types of deployments that may be used for PIoT communication.
Figure 8B:
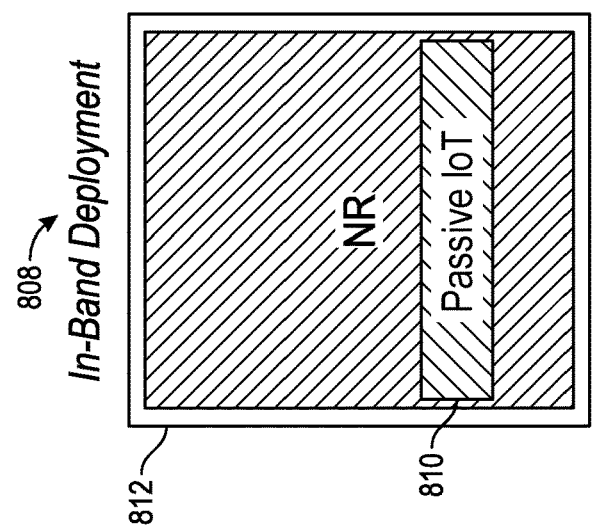
Figure 8A:
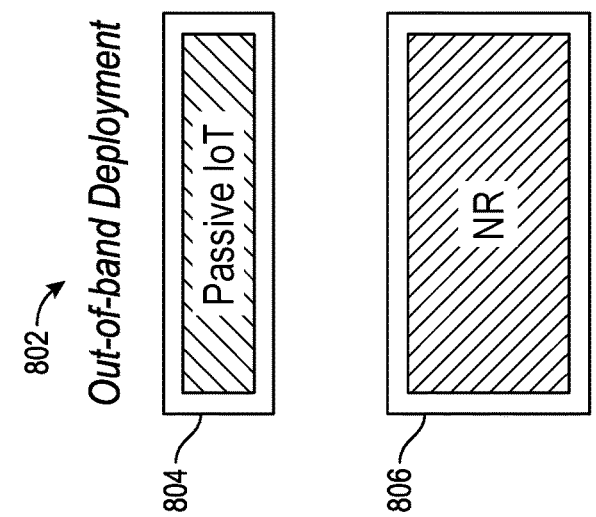

As illustrated in FIGS. 8A, 8B, and 8C, different types of deployments may be used for PIoT communication. For example, FIG. 8A illustrates a first deployment type 802 for communicating with the PIoT device 706. As shown, the first deployment type 802 includes an out-of-band deployment in which frequency resources for PIoT communication and frequency resources used for 5G new radio (NR) communication are separated into different frequency bands or bandwidth parts (BWPs). For example, as shown in FIG. 8A, the first deployment type 802 (e.g., out-of-band deployment) includes a first frequency band 804 for 5G NR communication and a separate second frequency band 806 for PIoT communication.

FIG. 8B illustrates a second deployment type 808 for communicating with the PIoT device 706. As shown, the second deployment type 808 includes an in-band deployment in which the frequency resources for PIoT communication are defined within a frequency band used for 5G NR communication. For example, as shown in FIG. 8B, a set frequency resources for PIoT communication 810 are defined within a frequency band 812 used for 5G NR communication. In other words, a portion of frequency resources allocated for 5G NR communication may be repurposed for PIoT communication.

FIG. 8C illustrates a third deployment type 814 for communicating with the PIoT device 706. As shown, the third deployment type 814 include a guard band deployment in which the frequency resources for PIoT communication and frequency resources for 5G NR communication are defined within a same frequency band or BWP but separated by a guard band. For example, as shown in FIG. 8C, a first set frequency resources for PIoT communication 816 and a second set of frequency resources 818 are defined within a frequency band 820 and are separated by a guard band 822.

Returning to FIG. 7, in some cases, the PIoT configuration information received in step 710 by the UE 704 may include a frequency range associated with communicating with the at least one PIoT device in the wireless network, a frequency reference point associated with communicating with the at least one PIoT device in the wireless network, and/or a bandwidth part associated with communicating with the at least one PIoT device in the wireless network. For example, in some cases, the PIoT configuration information may indicate a frequency range or frequency reference point of the frequency resources for the PIoT communication described above with respect to FIGS. 8A, 8B, and 8C. Additionally, for example, the PIoT configuration information may indicate a indicate a bandwidth part for the PIoT communication, such as the frequency bands 804, 812, or 820 illustrated in FIGS. 8A, 8B, and 8C.

In some cases, the PIoT configuration information may indicate a type of modulation for communicating with the PIoT device 706 (e.g., on-off keying (OOK), frequency shift keying (FSK), phase shift keying (PSK), etc.), a number of payload bits associated with communicating with the PIoT device 706, an expected response time associated with communicating with the PIoT device 706, and/or a collision resolution mechanism or bulk reading configuration associated with communicating with the PIoT device 706 (e.g., query tree (QT), ALOHA-based anti-collision algorithm, etc.)

In some cases, the PIoT configuration information may indicate a transmit power spectral mask associated with PIoT communication in the wireless network. For example, in some cases, a frequency band for the PIoT communication may be shared by multiple different UEs and PIoT devices. In some cases, pairs of UEs and PIoT devices may be separated into different channels within the frequency band for the PIoT communication and allocated different power spectral masks for PIoT transmissions. In some cases, the power spectral masks may depend on an interrogator deployment scenario (e.g., the number of UE-interrogators performing PIoT communication within a particular area).

Figure 9A:
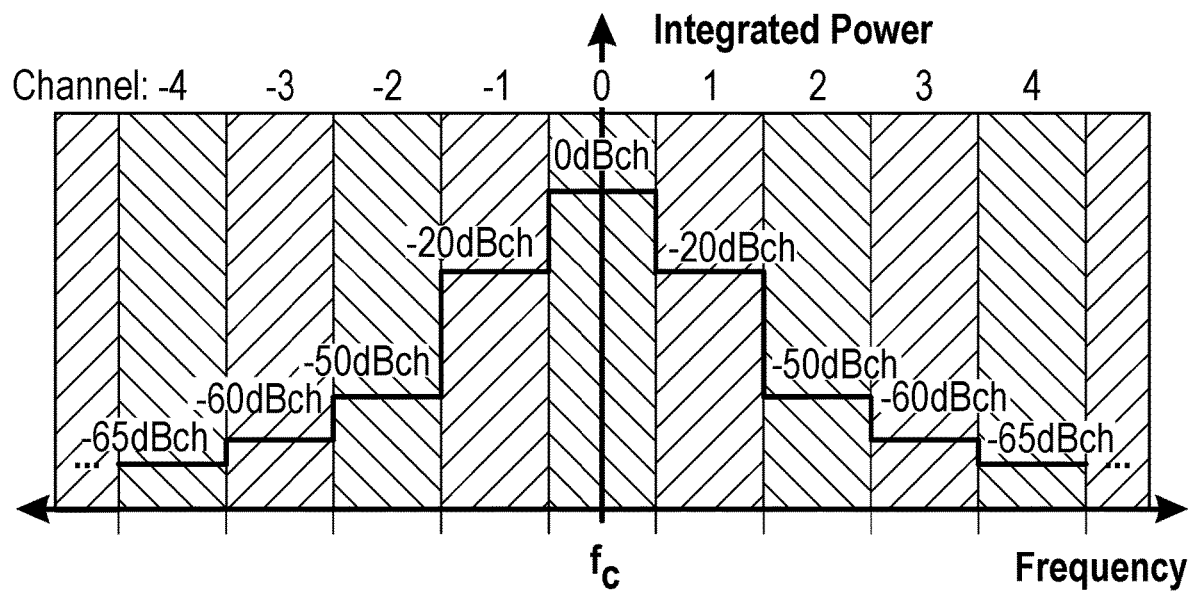
FIGS. 9A and 9B illustrate different power emission levels for different interrogator deployment scenarios.
Figure 9B:
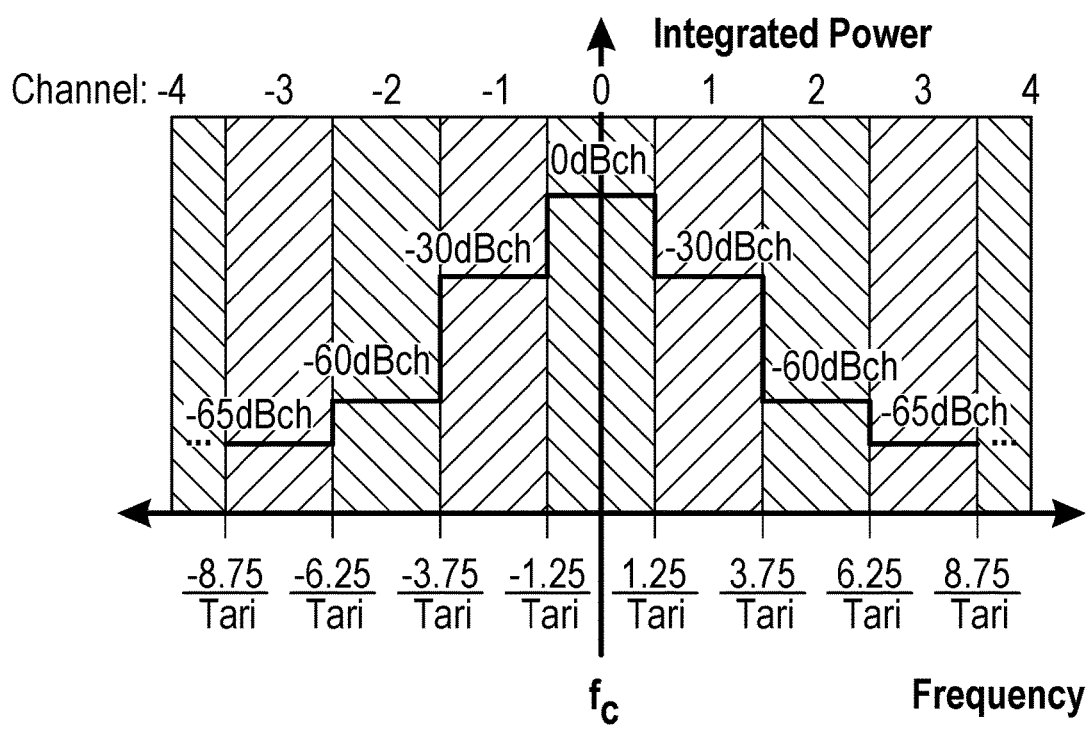

FIG. 9A illustrates power emission levels for a multi-interrogator deployment scenario while FIG. 9B illustrates power emission levels for a dense interrogator deployment scenario. In some cases, whether there is a multi-interrogator deployment scenario or a dense interrogator deployment scenario may depend on the number of interrogators/UEs deployed within a particular area. For example, when the number of interrogators/UEs deployed within an area is less than or equal to a threshold, the interrogator deployment scenario may comprise the multi-interrogator deployment scenario while when the number of interrogators/UEs deployed within an area is greater than the threshold, the interrogator deployment scenario may comprise the dense interrogator deployment scenario.

In some cases, to achieve the power emission levels illustrated in FIGS. 9A and 9B, the UE 704 may be indicated a power spectral mask to apply to PIoT transmissions for different channels. For example, as shown in FIG. 9A, for the multi-interrogator deployment scenario, the UE 704 may be indicated a particular power spectral mask for channel 1 such that emissions from the UE 704 (e.g., PIoT transmissions) do not exceed −20 dB. In some cases, the power spectral masks/emission levels may be more stringent for the dense interrogator scenarios. For example, as shown in FIG. 9B, for the dense interrogator deployment scenario, the UE 704 may be indicated a particular power spectral mask for channel 1 such that emissions from the UE 704 (e.g., PIoT transmissions) do not exceed −30 dB.

Returning to FIG. 7, after receiving the PIoT configuration information, the UE 704 transmits UE capability information to the network entity 702 in step 720. In some cases, the UE capability information may include an indication that the UE supports at least one of layer 1, layer 2, or layer 3 relaying for communicating with the PIoT device 706. For example, support for layer 1 relaying may involve the UE 704 simply receiving PIoT command messages from the network entity 702 and relaying these PIoT command messages to the PIoT device. Conversely, support layer 2 and layer 3 relaying may involve the UE 704 locally generating and transmitting the PIoT command messages to the PIoT device 706 for the network entity 702. In other words, in layer 1 (L1) relaying, the UE 704 merely acts as a relay device for PIoT command messages received from the network entity 702 while, in layer 2 (L2) and layer 3 (L3) relaying, the UE 704 may instead locally generate the PIoT command messages for the network entity 702 and transmits them to the PIoT device 706.

In some cases, the UE capability information may include transmission power support for at least one of multi-interrogator scenarios, dense interrogator scenarios, or both multi-interrogator scenarios and dense interrogator scenarios. In some cases, the UE capability information may include a transmit power range for one or more PIoT channels. In some cases, the UE capability information may include one or more supported modulation schemes for communicating with the PIoT device 706, such as double sideband amplitude shift keying (DSB-ASK), single sideband amplitude shift keying (SSB-ASK), or phase reverse amplitude shift keying (PR-ASK).

In some cases, the UE 704 proactively transmits the UE capability information to the network entity 702 in response to receiving the PIoT configuration information broadcast in a system information block (SIB) in step 715. For example, in some cases, the PIoT configuration information broadcast by the network entity 702 may include an indication that the network entity 702 supports PIoT communication. In response, the UE 704 may proactively transmit the UE capability information based on the indication that the network entity 702 supports the PIoT communication. In other cases, as shown in step 725, the UE 704 may receive a PIoT query message from the network entity 702 and, in response to receiving the PIoT query message, the UE 704 may transmit the UE capability information to the network entity 702.

In some cases, the PIoT configuration information received by the UE 704 may be conveyed in multiple messages from the network entity 702. For example, in step 715, the UE 704 may receive, in the SIB broadcast by the network entity 702, a first set of parameters for communicating with the PIoT device 706. Thereafter, as shown in step 730, the UE 704 may receive additional PIoT configuration information including a second set of parameters for communicating with the PIoT device 706. In some cases, the second set of parameters may be received in radio resource control (RRC) signaling from the network entity 702. In some cases, the additional PIoT configuration information may be received by the UE 704 based on the UE capability information transmitted in step 720. In some cases, the first set of parameters received in the SIB may include at least one of a mandatory frequency band for communicating with the at least one PIoT device, a mandatory modulation scheme for communicating with the at least one PIoT device, or a mandatory transmit power for communicating with the at least one PIoT device. In some cases, the second set of parameters include at least one of an optional frequency band for communicating with the at least one PIoT device, an optional modulation scheme for communicating with the at least one PIoT device, or an optional transmit power for communicating with the at least one PIoT device.

In step 735, the UE 704 receives, from the network entity 702, a PIoT message. In some cases, the PIoT message may include at least a PIoT relay command instructing the UE to communicate with the PIoT device 706. In some cases, the PIoT relay command is received in at least one of a media access control-control element (MAC-CE), downlink control information (DCI), or RRC signaling. In some cases, the PIoT message is received on at least one of a physical downlink control channel (PDCCH) or a physical downlink shared channel (PDSCH).

In some cases, the PIoT message and PIoT relay command may be based on a PIoT relay request message transmitted by the UE 704 to the network entity 702. For example, as shown in step 740, the UE 704 may optionally transmit a PIoT relay request message to the network entity 702 requesting to perform communication relaying with the PIoT device 706. In some cases, the UE 704 may transmit the PIoT relay request message in response to detecting/discovering the PIoT device 706. For example, in some cases, as shown in step 745, the UE 704 may perform a discovery procedure to detect the PIoT device 706. In some cases, the UE 704 may detect the PIoT device 706 based on at least one of (i) a power associated with a PIoT BWP exceeding a threshold or (ii) decoding a message from the at least one PIoT device. Thereafter, the UE 704 may transmit the PIoT relay request message in step 740 based on the detection of the PIoT device 706 and receive PIoT message and PIoT relay command in step 735 in response to the PIoT relay request message.

Thereafter, in step 750, the UE 704 transmits, based on the PIoT message received in step 735, one or more signals to the PIoT device 706 in accordance with the PIoT configuration information received from the network entity 702. Thereafter, in step 755, the UE 704 receives response information from the PIoT device 706 based on the one or more signals transmitted to the PIoT device 706. The UE 704 may then transmit the response information received from the PIoT device 706 to the network entity 702.

In some cases, transmitting the one or more signals to the PIoT device 706 may depend on a type of relaying requested by the network entity 702. For example, in some cases, the PIoT message received by the UE 704 in step 735 may include an indication of a type of PIoT relaying to use for communicating with the PIoT device 706, the type of the PIoT relaying indicating one of L1 relaying, L2 relaying, or L3 relaying.

In some cases, the PIoT message may indicate a time gap between reception or transmission of the PIoT message and transmission of the one or more signals. In some cases, the PIoT message may indicate a transmit power for transmitting the one or more signals to the PIoT device 706. In some cases, the PIoT message may a channel index associated with a channel for transmitting the one or more signals to the PIoT device 706. In some cases, the PIoT message may indicate a data rate for transmitting the one or more signals to the PIoT device 706. In some cases, the PIoT message may indicate a data rate for receiving one or more signals from the PIoT device 706. In some cases, the PIoT message may indicate a transmission scenario indicating one of a multi-interrogator scenario or a dense interrogator scenario.

In some cases, the PIoT message received in step 735 may indicate L1 PIoT relaying. In the cases where L1 PIoT relaying is indicated, transmitting the one or more signals to the PIoT device 706 in step 750 may include transmitting a (unmodulated) continuous wave energy signal for powering the PIoT device 706 (e.g., to power the PIoT device 706, as described above) and transmitting one or more modulated data messages for the PIoT device 706.

In some cases, for L1 relaying, transmitting the one or more modulated data messages for the PIoT device 706 comprises relaying at least a portion of the PIoT message to the PIoT device 706. For example, as noted above, the PIoT message may be received on a PDSCH or PDCCH and may include, in addition to information intended for the UE 704 (e.g., the indication of the type of relaying), information intended for transmission to the PIoT device 706, such as one or more PIoT command messages (e.g., a select command, a query command, or an access command). Accordingly, when L1 relaying is used, the UE 704 may transmit the continuous wave energy signal to power the PIoT device 706 and may thereafter relay the one or more PIoT command messaged included in the PIoT message received from the network entity 702. In some cases, the one or more modulated data messages (e.g., including the one or more PIoT command messages) may be transmitted to the PIoT device 706 for the duration indicated in the PIoT message and using the transmit power and one or more beams indicated by the beam information included within the PIoT message.

In some cases, the PIoT message received in step 735 may indicate L2 PIoT relaying or L3 PIoT relaying. In such cases, the PIoT message received from the network entity 702 may include scheduling information that schedules the UE 704 to transmit a continuous wave energy signal, such as the continuous wave shown in FIG. 6, to power the PIoT device 706 and to generate and transmit one or more PIoT command messages to the PIoT device 706.

Accordingly, for example, based on the scheduling information, transmitting the one or more signals to the PIoT device 706 in step 750 comprises transmitting the continuous wave energy signal for powering the at least one PIoT device and transmitting the one or more modulated data messages for the at least one PIoT device. In some cases, the one or more modulated data messages may comprise the one or more PIoT command messages, which, as noted above, may include a select command, a query command, or an access command.

Figure 10A:
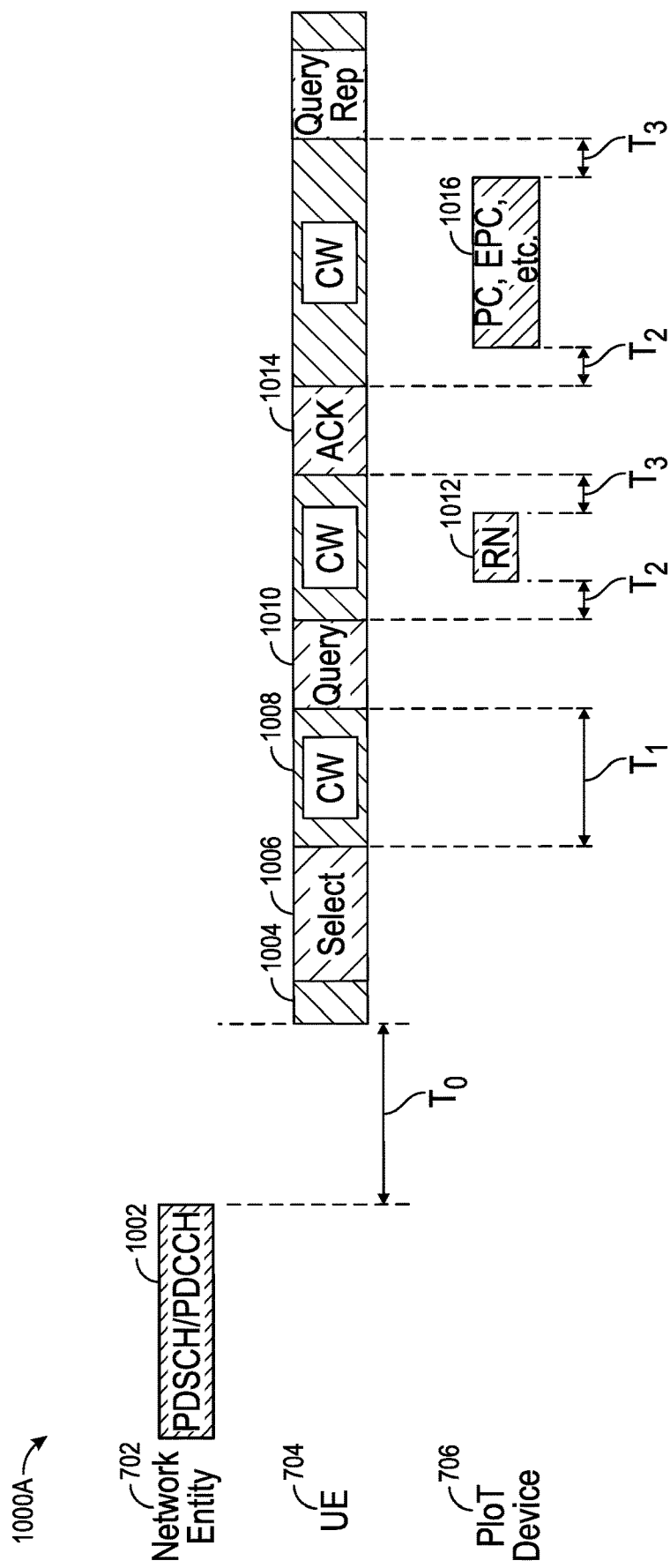
FIG. 10A includes a timeline illustrating layer 2/layer 3 relaying involving a user equipment generating and transmitting PIoT command messages to a PIoT device.

FIG. 10A includes a timeline 1000A illustrating L2/L3 relaying involving the UE 704 generating and transmitting PIoT command messages to the PIoT device 706. As shown, the network entity 702 transmits a PDSCH/PDCCH transmission 1002 to the UE 704. The PDSCH/PDCCH transmission 1002 may include the PIoT message and PIoT relay command received by the UE 704 in step 735 in FIG. 7. As noted above, the PIoT message included within the PDSCH/PDCCH transmission 1002 may include scheduling information that schedules the UE 704 to transmit a continuous wave energy signal to power the PIoT device 706 and to generate and transmit one or more PIoT command messages to the PIoT device 706.

For example, as illustrated, based on the scheduling information, the UE 704 transmits the continuous wave energy signal as shown at 1004. In some cases, a time period or time gap between reception of the PIoT message in the PDSCH/PDCCH transmission 1002 and transmission of the continuous wave energy signal may be denoted $T_0$. In some cases, the time gap $T_0$ may be included in the PIoT message in the PDSCH/PDCCH transmission 1002 and indicates a starting time (e.g., after reception of the PIoT message) for downlink relaying by the UE 704 (e.g., commencement of the transmission of the continuous wave energy signal and one or more PIoT command message to the PIoT device 706).

The PIoT device 706 may receive the continuous wave energy signal from the UE 704, allowing the PIoT device 706 to harvest energy from the continuous wave energy signal and power itself on. Once the PIoT device 706 is powered on, the UE 704 transmits a first PIoT command message to the PIoT device 706 by modulating the continuous wave energy signal with information within the first PIoT command message. In some cases, the first PIoT command message transmitted at 1006 may comprise a "select" command, indicating a PIoT device population selected for inventory operations or to authenticate a PIoT device population, such as a PIoT device population in which the PIoT device 706 is included.

After transmitting the first PIoT command (e.g., the select command), the UE 704 continues to transmit the continuous wave energy signal as shown at 1008 to keep the PIoT device 706 powered on. As shown, at 1010, the UE 704 transmits a second PIoT command message, such as a query message, by modulating the continuous wave energy signal with information in the second PIoT command message. In some cases, the query message may indicate one or more identified PIoT devices, such as the PIoT device 706, that are being queried for inventory. In some cases, the period of time between transmission of the first PIoT command message and the second PIoT command message is denoted $T_1$ and is a minimum time gap between two downlink messages (e.g., messages transmitted from the UE 704 to the PIoT device 706).

The PIoT device 706 may receive and process the second PIoT command message. Thereafter, as shown at 1012, the PIoT device 706 responds to the UE 704 by transmitting an RN message. As shown, a time period between reception of the second PIoT command message and transmission of the RN message is denoted $T_2$, which is within a specified range of $T_{2,min}$ and $T_{2,max}$.

Thereafter, at 1014, the UE 704 transmits an ACK message to the PIoT device 706, acknowledging reception of the RN message. As shown, a time period between reception of the RN message by the UE 704 and transmission of the ACK message is denoted $T_3$, which is within a specified range of $T_{3,min}$ and $T_{3,max}$. In some cases, a length of the time periods $T_2$ and $T_3$ may depend on and may be different for different message types (e.g., query, query adjust, lock, authenticate, etc.), as noted above.

Thereafter, as shown at 1016, in response to receiving the ACK message, the PIoT device 706 transmits, to the UE 704, additional information stored in memory of the PIoT device 706, such a protocol code (PC), an electronic product code (EPC), or the like. In some cases, the UE 704 may forward this additional information to the network entity 702 (e.g., as shown in step 760 in FIG. 7).

In some cases, L1/L2/L3 relaying may be signaled separately for the continuous wave energy signal and an information signal carrying the one or more PIoT commands. For example, in some cases, rather than having the UE 704 transmit both the continuous wave energy signal and the one or more PIoT command messages to the PIoT device 706, the network entity 702 may instead configure the UE 704 to only transmit the continuous wave energy signal to power the PIoT device 706. In such cases, while the PIoT device 706 is powered on due to the continuous wave energy signal transmitted by the UE 704, the network entity 702 may, itself, transmit the one or more PIoT command messages to the PIoT device 706. While there may be scenarios in which the network entity 702 is located far away from the PIoT device 706 (e.g., greater than 10 meters), a link budget associated with transmissions between the network entity 702 and PIoT device 706 may be sufficient for proper decoding of these transmissions.

Figure 10B:
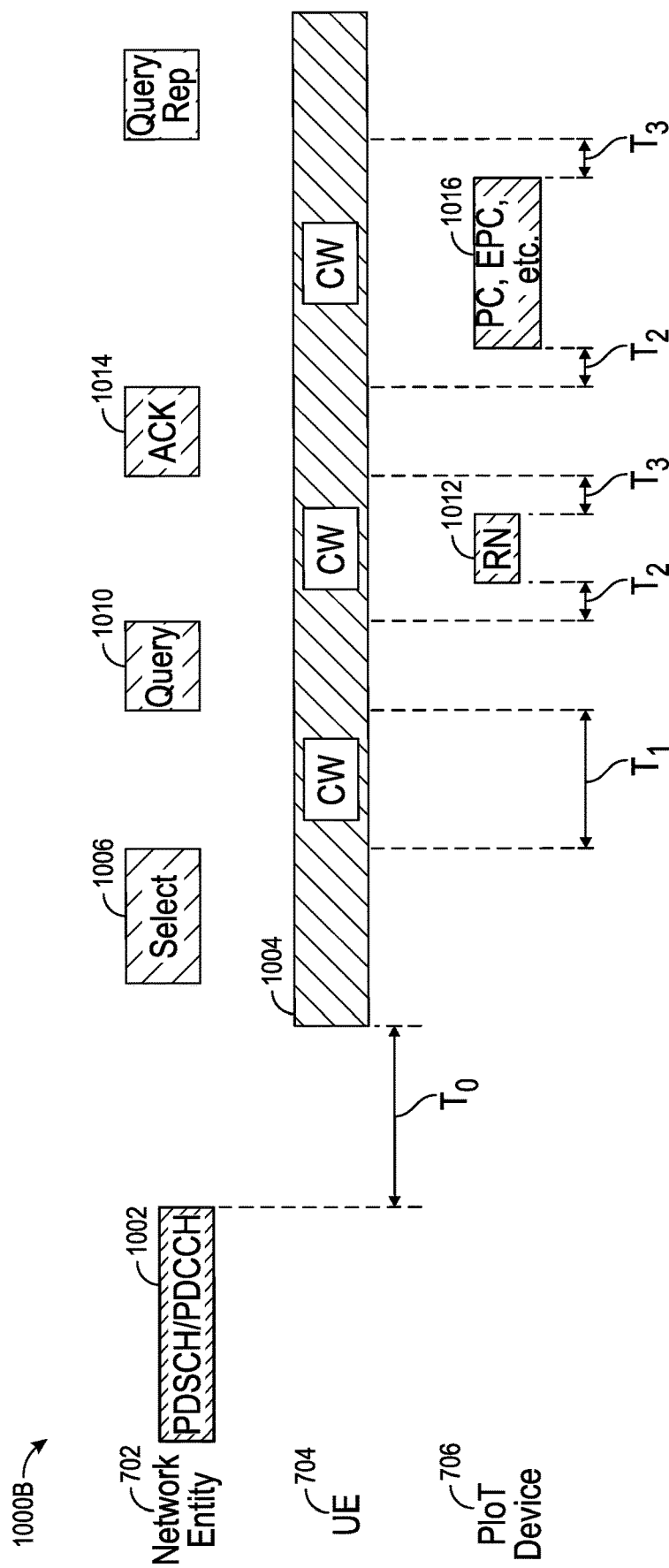
FIG. 10B includes a timeline illustrating layer 2/layer 3 relaying involving a user equipment transmitting only a continuous wave energy signal to power a PIoT device and a network entity transmitting PIoT commands to the PIoT device directly.

FIG. 10B includes a timeline 1000B illustrating L2/L3 relaying involving the UE 704 transmitting only a continuous wave energy signal to power the PIoT device 706 and the network entity 702 transmitting PIoT commands to the PIoT device 706 directly. As shown, the network entity 702 transmits the PDSCH/PDCCH transmission 1002 to the UE 704. The PDSCH/PDCCH transmission 1002 may include the PIoT message and PIoT relay command received by the UE 704 in step 735 in FIG. 7. As noted above, the PIoT message included within the PDSCH/PDCCH transmission 1002 may include scheduling information. However, in contrast to the scheduling information discussed with respect to FIG. 10A, the scheduling information received by the UE 704 in FIG. 10B may only schedule the UE 704 to transmit a continuous wave energy signal to power the PIoT device 706 and to generate and transmit one or more PIoT command messages to the PIoT device 706.

Accordingly, as shown at 1004, based on the scheduling information, the UE 704 transmits the continuous wave energy signal to power the PIoT device 706. Thereafter, once the PIoT device is powered on, rather than the UE 704 acting as a relay between the network entity 702 and PIoT device 706, the network entity 702 may instead communicate messages directly with the PIoT device 706, such as the first PIoT command message shown at 1006 (e.g., the search command), the second PIoT command message shown at 1010 (e.g., the query command), the RN message shown at 1012, the ACK message shown at 1014, and the additional information (e.g., PC, EPC, etc.) shown at 1016.

Example Operations of a User Equipment

Figure 11:
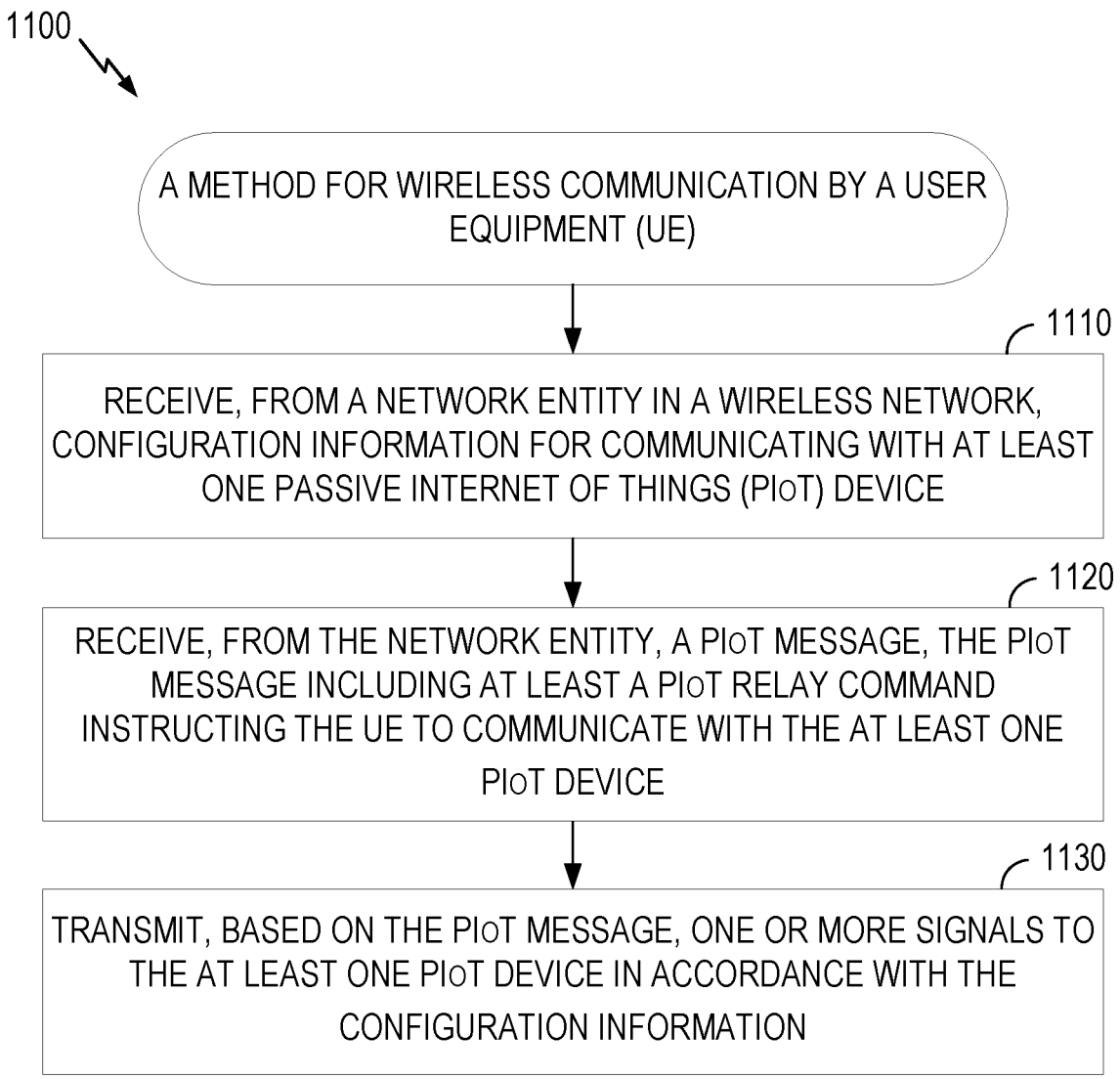
FIG. 11 depicts a method for wireless communications.

FIG. 11 shows a method 1100 for wireless communications by a UE, such as UE 104 of FIGS. 1 and 3.

Method 1100 begins at 1110 with receiving, from a network entity in a wireless network, configuration information for communicating with at least one passive internet of things (PIoT) device.

Method 1100 then proceeds to step 1120 with receiving, from the network entity, a PIoT message, the PIoT message including at least a PIoT relay command instructing the UE to communicate with the at least one PIoT device.

Method 1100 then proceeds to step 1130 with transmitting, based on the PIoT message, one or more signals to the at least one PIoT device in accordance with the configuration information.

In some cases, the configuration information includes one or more parameters for communicating with the at least one PIoT device. In some cases, the one or more parameters including at least one of: a type of deployment, a frequency range, a frequency reference point, a bandwidth part, a type of modulation, a number of payload bits for transmissions, an expected response time, a collision resolution mechanism, or an indication of a transmit power spectral mask.

In some cases, receiving the configuration information in step 1110 includes receiving, in a system information block broadcast by the network entity, a first set of parameters for communicating with the at least one PIoT device, and receiving, in radio resource control (RRC) signaling from the network entity, a second set of parameters for communicating with the at least one PIoT device.

In some cases, the first set of parameters include at least one of a mandatory frequency band, a mandatory modulation scheme, or a mandatory transmit power for communicating with the at least one PIoT device. In some cases, the second set of parameters include at least one of an optional frequency band, an optional modulation scheme, or an optional transmit power for communicating with the at least one PIoT device.

In some cases, the method 1100 may further include transmitting UE capability information indicating that the UE supports PIoT communication. In some cases, receiving the configuration information is based on the UE capability information.

In some cases, the method 1100 may further include receiving, in system information broadcast by the network entity, an indication that the network entity supports PIoT communication. In some cases, transmitting the UE capability information is based on receiving the indication that the network entity supports the PIoT communication.

In some cases, the method 1100 may further include receiving, from the network entity, a query message requesting the UE to transmit the UE capability information. In some cases, transmitting the UE capability information is further based on the query message.

In some cases, the method 1100 may further include transmitting, to the network entity, a PIoT relay request message requesting to perform communication relaying with the at least one PIoT device. In some cases, receiving the PIoT relay command is based on the PIoT relay request message.

In some cases, the PIoT relay command is received in at least one of a media access control-control element (MAC-CE), downlink control information (DCI), or radio resource control (RRC) signaling.

In some cases, the method 1100 may further include detecting the at least one PIoT device based on at least one of (i) a power associated with a PIoT bandwidth part (BWP) exceeding a threshold or (ii) decoding a message from the at least one PIoT device, wherein transmitting the PIoT relay request message is based on the detection of the at least one PIoT device.

In some cases, the UE capability information further indicates at least one of: an indication that the UE supports at least one of layer 1, layer 2, or layer 3 relaying for communicating with the at least one PIoT device, transmission power support for at least one of multi-interrogator scenarios, dense interrogator scenarios, or both multi-interrogator scenarios and dense interrogator scenarios, a transmit power range for one or more PIoT channels, or one or more supported modulation schemes for communicating with the at least one PIoT device.

In some cases, the PIoT message is received on at least one of a physical downlink control channel (PDCCH) or a physical downlink shared channel (PDSCH).

In some cases, the one or more signals comprise at least one of: a continuous wave energy signal for powering the at least one PIoT device and one or more modulated data messages for the at least one PIoT device, or a continuous wave energy signal for powering only the at least one PIoT device.

In some cases, the PIoT message includes an indication of a type of PIoT relaying to use for communicating with the at least one PIoT device. In some cases, the type of the PIoT relaying comprises one of layer 1 (L1) PIoT relaying, layer 2 (L2) PIoT relaying, or layer 3 (L3) PIoT relaying.

In some cases, the type of the PIoT relaying comprises L1 PIoT relaying, and based on the L1 PIoT relaying, the PIoT message includes an indication of at least one of a transmit power for transmitting the one or more signals to the at least one PIoT device, a duration for transmitting the one or more signals to the at least one PIoT device, or beam information for communicating with the at least one PIoT device.

In some cases, based on the L1 PIoT relaying, transmitting the one or more signals to the at least one PIoT device in step 1130 may include: transmitting the continuous wave energy signal for powering the at least one PIoT device and transmitting the one or more modulated data messages for the at least one PIoT device. In some cases, transmitting the one or more modulated data messages for the at least one PIoT device comprises relaying at least a portion of the PIoT message to the at least one PIoT device.

In some cases, the type of the PIoT relaying comprises L2 PIoT relaying or L3 PIoT relaying, and based on the L2 PIoT relaying or the L3 PIoT relaying, the PIoT message includes scheduling information, scheduling the UE to generate and transmit one or more PIoT command messages to the at least one PIoT device.

In some cases, the one or more PIoT command messages comprise at least one of a select command, a query command, or an access command.

In some cases, based on the scheduling information, transmitting the one or more signals to the at least one PIoT device in step 1130 may include transmitting the continuous wave energy signal for powering the at least one PIoT device and transmitting the one or more modulated data messages for the at least one PIoT device. In some cases, the one or more modulated data messages comprising the one or more PIoT command messages.

In some cases, the PIoT message indicates a time gap between reception or transmission of the PIoT message and transmission of the one or more signals.

In some cases, the PIoT message indicates at least one of: a transmit power for transmitting the one or more signals to the at least one PIoT device, a channel index associated with a channel for transmitting the one or more signals to the at least one PIoT device, a data rate for transmitting the one or more signals to the at least one PIoT device, a data rate for receiving one or more signals from the at least one PIoT device, or a transmission scenario indicating one of a multi-interrogator scenario or a dense interrogator scenario.

In some cases, the method 1100 may further include receiving response information from the at least one PIoT device the one or more signals transmitted to the at least one PIoT device and transmitting, to the network entity, the response information received from the at least one PIoT device.

Figure 13:
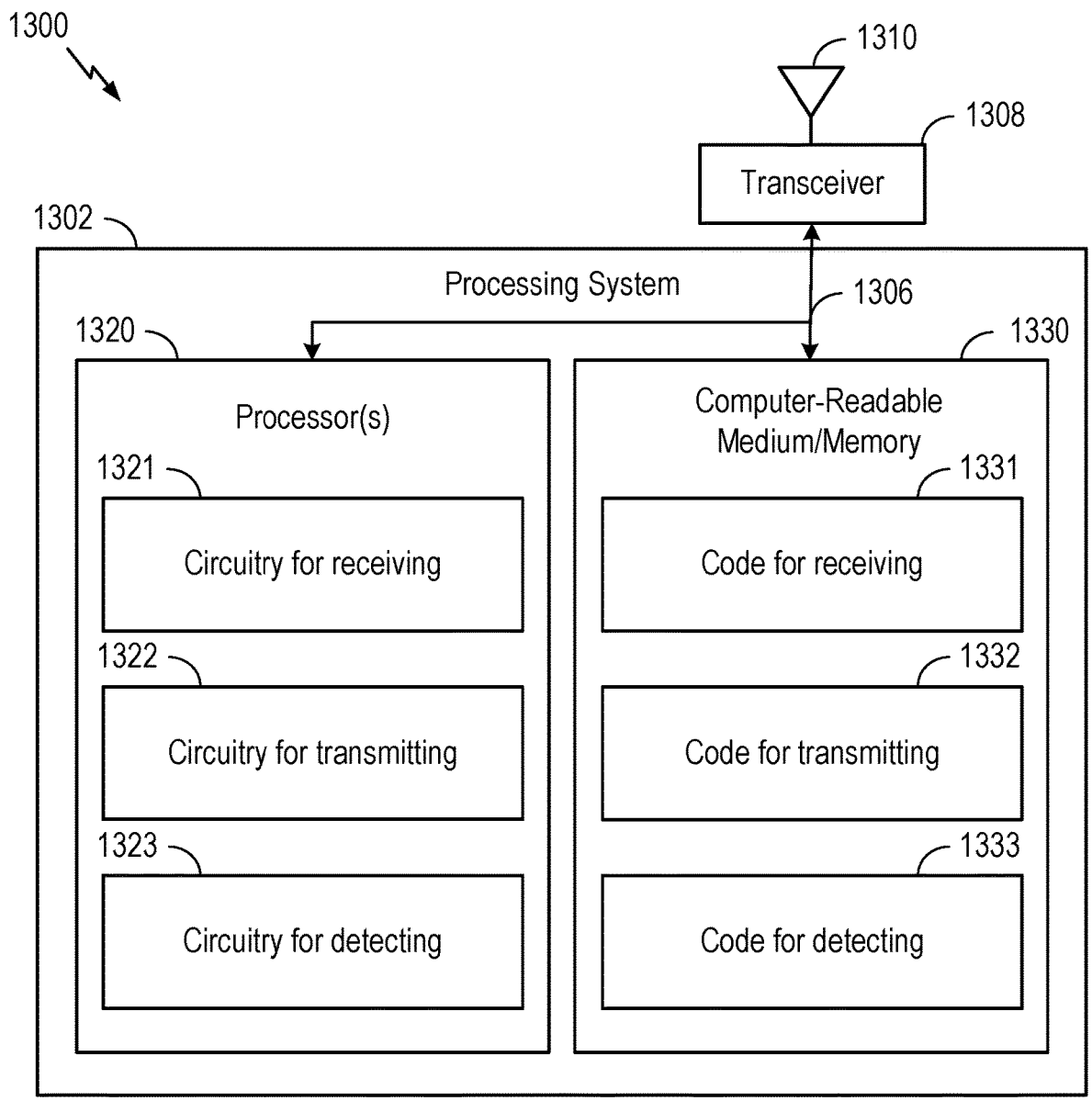
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Operations of a Network Entity

Figure 12:
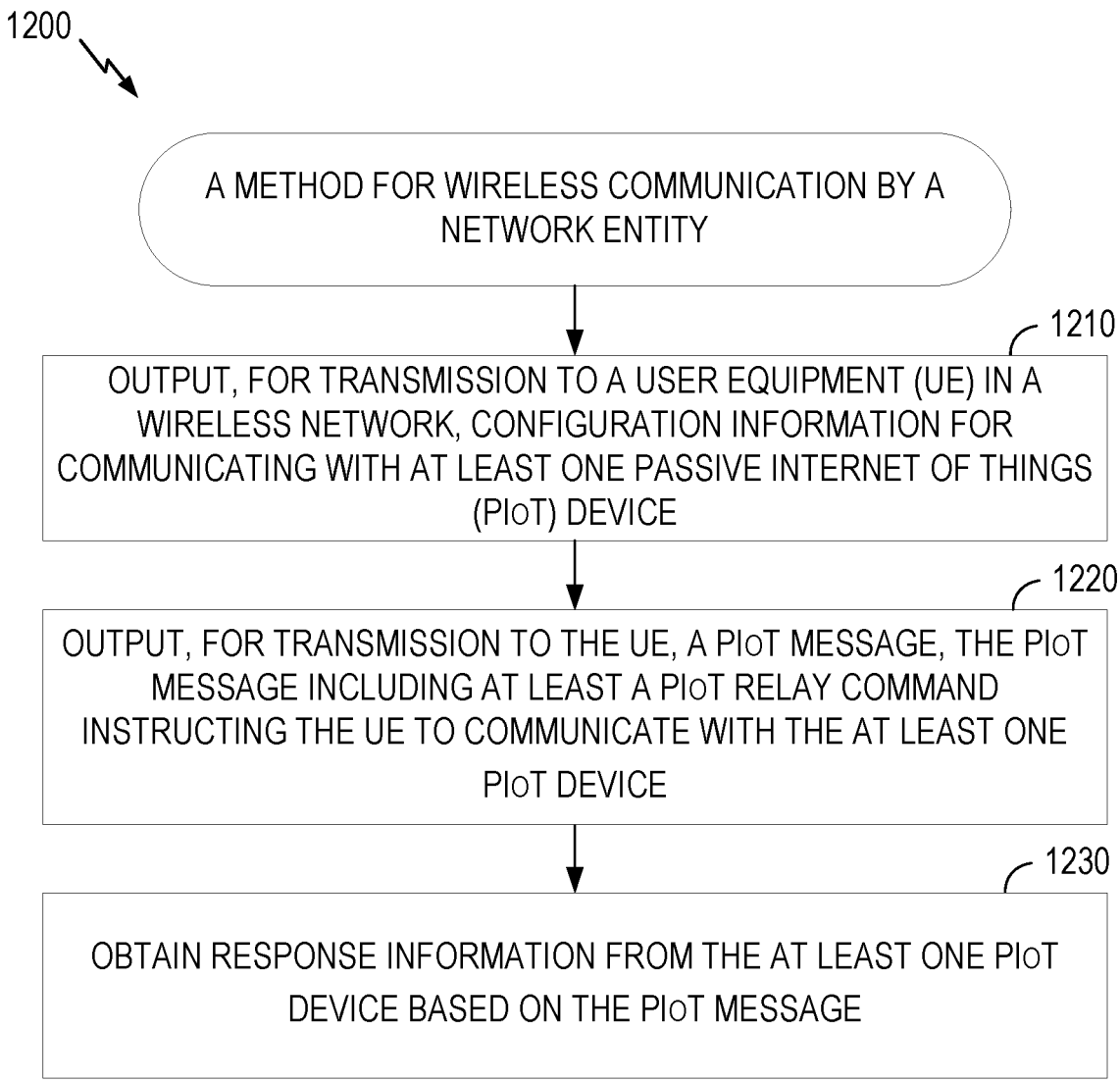
FIG. 12 depicts a method for wireless communications.

FIG. 12 shows a method 1200 for wireless communications by a network entity, such as BS 102 of FIGS. 1 and 3, or a disaggregated base station as discussed with respect to FIG. 2.

Method 1200 begins at 1210 with outputting, for transmission to a user equipment (UE) in a wireless network, configuration information for communicating with at least one passive internet of things (PIoT) device.

Method 1200 then proceeds to step 1220 with outputting, for transmission to the UE, a PIoT message, the PIoT message including at least a PIoT relay command instructing the UE to communicate with the at least one PIoT device.

Method 1200 then proceeds to step 1220 with obtaining response information from the at least one PIoT device based on the configuration information and the PIoT message.

In some cases, the configuration information includes one or more parameters for communicating with the at least one PIoT device. In some cases, the one or more parameters including at least one of: a type of deployment, a frequency range, a frequency reference point, a bandwidth part, a type of modulation, a number of payload bits for transmissions, an expected response time, a collision resolution mechanism, or an indication of a transmit power spectral mask.

In some cases, outputting the configuration information for transmission to the UE in step 1210 may include outputting, for transmission to the UE in a system information block broadcast, a first set of parameters for communicating with the at least one PIoT device, and outputting, for transmission to the UE in radio resource control (RRC) signaling, a second set of parameters for communicating with the at least one PIoT device.

In some cases, the first set of parameters include at least one of a mandatory frequency band, a mandatory modulation scheme, or a mandatory transmit power for communicating with the at least one PIoT device. In some cases, the second set of parameters include at least one of an optional frequency band, an optional modulation scheme, or an optional transmit power for communicating with the at least one PIoT device.

In some cases, the method 1200 may further include obtaining UE capability information indicating that the UE supports PIoT communication. In some cases, outputting the configuration information for transmission to the UE in step 1210 is based on the UE capability information.

In some cases, the method 1200 may further include outputting, for transmission to the UE in system information broadcast, an indication that the network entity supports PIoT communication. In some cases, obtaining the UE capability information is based on the indication that the network entity supports the PIoT communication.

In some cases, the method 1200 may further include outputting, for transmission to the UE, a query message requesting the UE to transmit the UE capability information. In some cases, obtaining the UE capability information is further based on the query message.

In some cases, the method 1200 may further include obtaining, from the UE, a PIoT relay request message requesting to perform communication relaying with the at least one PIoT device. In some cases, outputting the PIoT message including the PIoT relay command in step 1220 is based on the PIoT relay request message.

In some cases, the PIoT relay command is output for transmission in at least one of a media access control-control element (MAC-CE), downlink control information (DCI), or radio resource control (RRC) signaling.

In some cases, the UE capability information further indicates at least one of: an indication that the UE supports at least one of layer 1, layer 2, or layer 3 relaying for communicating with the at least one PIoT device, transmission power support for at least one of multi-interrogator scenarios, dense interrogator scenarios, or both multi-interrogator scenarios and dense interrogator scenarios, a transmit power range for one or more PIoT channels, or one or more supported modulation schemes for communicating with the at least one PIoT device.

In some cases, the PIoT message is output for transmission on at least one of a physical downlink control channel (PDCCH) or a physical downlink shared channel (PDSCH).

In some cases, the PIoT message includes scheduling information for scheduling the UE to transmit one or more signals to the at least one PIoT device. In some cases, the one or more signals comprise at least one of: a continuous wave energy signal for powering the at least one PIoT device and one or more modulated data messages for the at least one PIoT device, or a continuous wave energy signal for powering only the at least one PIoT device.

In some cases, the PIoT message indicates a time gap between reception or transmission of the PIoT message and transmission of the one or more signals.

In some cases, the PIoT message indicates at least one of: a transmit power for transmitting one or more signals to the at least one PIoT device, a channel index associated with a channel for transmitting one or more signals to the at least one PIoT device, a data rate for transmitting one or more signals to the at least one PIoT device, a data rate for receiving one or more signals from the at least one PIoT device, or a transmission scenario indicating one of a multi-interrogator scenario or a dense interrogator scenario.

In some cases, the scheduling information schedules the UE to transmit the continuous wave energy signal for powering only the at least one PIoT device.

In some cases, the method 1200 may further include outputting, for transmission to the at least one PIoT device, one or more PIoT command messages to the at least one PIoT device. In some cases, the one or more PIoT command messages comprise at least one of a select command, a query command, or an access command, and the response information is obtained directly from the at least one PIoT device.

In some cases, the scheduling information schedules the UE to transmit the continuous wave energy signal for powering the at least one PIoT device and the one or more modulated data messages for the at least one PIoT device.

In some cases, the response information is obtained in step 1230 indirectly from the at least one PIoT device via the UE.

In some cases, the PIoT message includes an indication of a type of PIoT relaying to use for communicating with the at least one PIoT device. In some cases, the type of the PIoT relaying comprises one of layer 1 (L1) PIoT relaying, layer 2 (L2) PIoT relaying, or layer 3 (L3) PIoT relaying.

In some cases, the type of the PIoT relaying comprises L1 PIoT relaying, and based on the L1 PIoT relaying, the PIoT message includes an indication of at least one of a transmit power for transmitting one or more signals to the at least one PIoT device, a duration for transmitting one or more signals to the at least one PIoT device, or beam information for communicating with the at least one PIoT device.

In some cases, the type of the PIoT relaying comprises L2 PIoT relaying or L3 PIoT relaying, and based on the L2 PIoT relaying or the L3 PIoT relaying, the PIoT message includes scheduling information scheduling the UE to transmit one or more PIoT command messages to the at least one PIoT device.

In some cases, the one or more PIoT command messages comprise at least one of a select command, a query command, or an access command.

Figure 14:
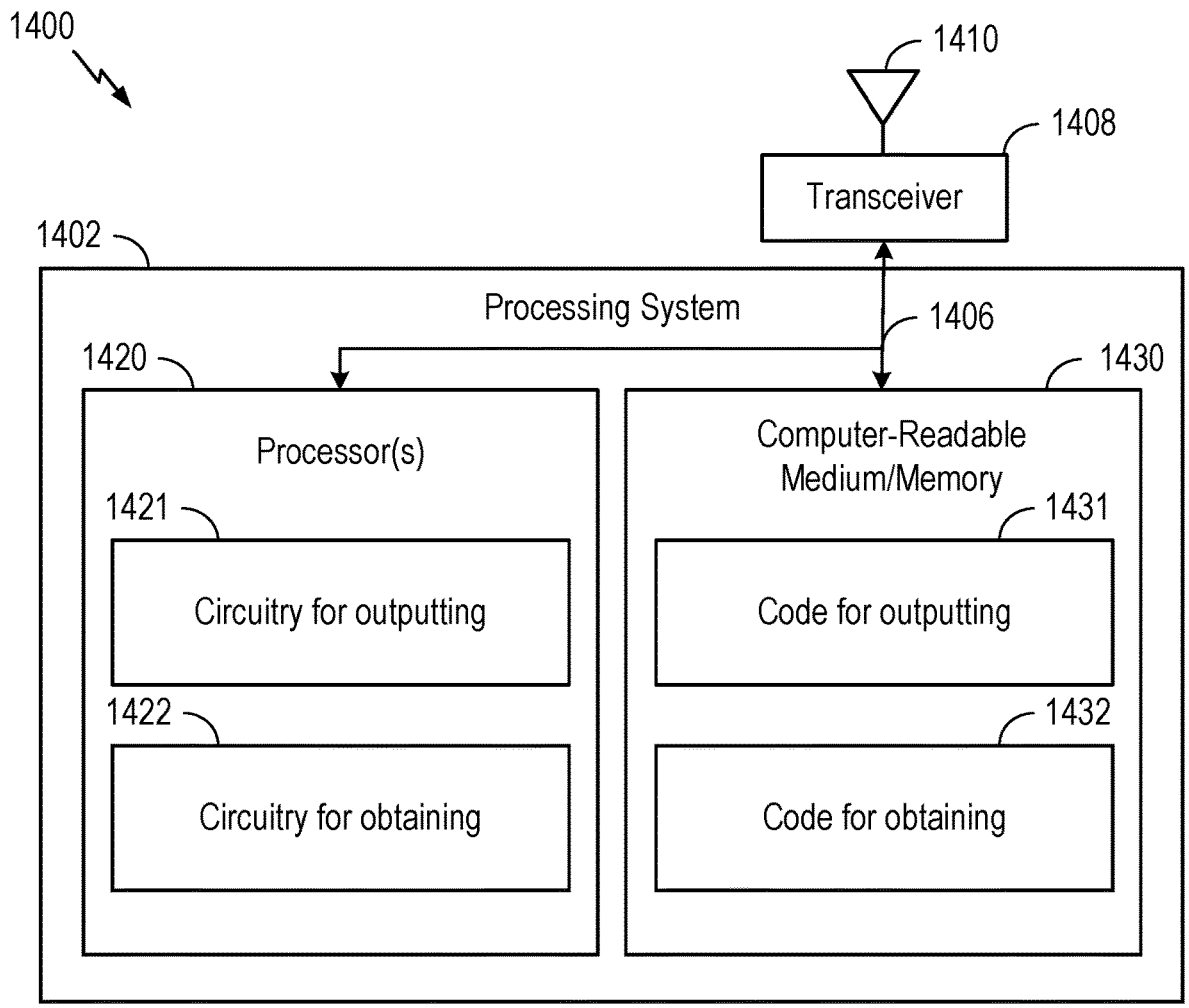
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 358, transmit processor 364, TX MIMO processor 366, and/or controller/processor 380, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the method 1100 described with respect to FIG. 11, or any aspect related to it. Note that reference to a processor performing a function of communications device 1300 may include one or more processors performing that function of communications device 1300.

In the depicted example, computer-readable medium/memory 1330 stores code (e.g., executable instructions) for receiving 1331, code for transmitting 1332, and code for detecting 1333. Processing of the code 1331-1333 may cause the communications device 1300 to perform the method 1100 described with respect to FIG. 11, or any aspect related to it.

The one or more processors 1320 include circuitry configured to implement (e.g., execute) the code stored in the computer-readable medium/memory 1330, including circuitry for receiving 1321, circuitry for transmitting 1322, and circuitry for detecting 1323. Processing with circuitry 1321-1323 may cause the communications device 1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending or outputting for transmission may include the transceivers 354 and/or antenna(s) 352 of the UE 104 illustrated in FIG. 3 and/or transceiver 1308 and antenna 1310 of the communications device 1300 in FIG. 13. Means for receiving or obtaining may include the transceivers 354 and/or antenna(s) 352 of the UE 104 illustrated in FIG. 3 and/or transceiver 1308 and antenna 1310 of the communications device 1300 in FIG. 13.

FIG. 14 depicts aspects of an example communications device. In some aspects, communications device 1400 is a network entity, such as BS 102 of FIGS. 1 and 3, or a disaggregated base station as discussed with respect to FIG. 2.

The communications device 1400 includes a processing system 1402 coupled to a transceiver 1408 (e.g., a transmitter and/or a receiver) and/or a network interface 1412. The transceiver 1408 is configured to transmit and receive signals for the communications device 1400 via an antenna 1410, such as the various signals as described herein. The network interface 1412 is configured to obtain and send signals for the communications device 1400 via communications link(s), such as a backhaul link, midhaul link, and/or fronthaul link as described herein, such as with respect to FIG. 2. The processing system 1402 may be configured to perform processing functions for the communications device 1400, including processing signals received and/or to be transmitted by the communications device 1400.

The processing system 1402 includes one or more processors 1420. In various aspects, one or more processors 1420 may be representative of one or more of receive processor 338, transmit processor 320, TX MIMO processor 330, and/or controller/processor 340, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the method 1200 described with respect to FIG. 12, or any aspect related to it. Note that reference to a processor of communications device 1400 performing a function may include one or more processors of communications device 1400 performing that function.

In the depicted example, the computer-readable medium/memory 1430 stores code (e.g., executable instructions) for outputting 1431 and code for obtaining 1432. Processing of the code 1431-1432 may cause the communications device 1400 to perform the method 1200 described with respect to FIG. 12, or any aspect related to it.

The one or more processors 1420 include circuitry configured to implement (e.g., execute) the code stored in the computer-readable medium/memory 1430, including circuitry for outputting 1421 and circuitry for obtaining 1422. Processing with circuitry 1421-1422 may cause the communications device 1400 to perform the method 1200 as described with respect to FIG. 12, or any aspect related to it.

Various components of the communications device 1400 may provide means for performing the method 1200 as described with respect to FIG. 12, or any aspect related to it. Means for transmitting, sending or outputting for transmission may include the transceivers 332 and/or antenna(s) 334 of the BS 102 illustrated in FIG. 3 and/or transceiver 1408 and antenna 1410 of the communications device 1400 in FIG. 14. Means for receiving or obtaining may include the transceivers 332 and/or antenna(s) 334 of the BS 102 illustrated in FIG. 3 and/or transceiver 1408 and antenna 1410 of the communications device 1400 in FIG. 14.

Example Clauses

Implementation examples are described in the following numbered clauses:

Clause 1: A method for wireless communication by a user equipment (UE), comprising: receiving, from a network entity in a wireless network, configuration information for communicating with at least one passive internet of things (PIoT) device; receiving, from the network entity, a PIoT message, the PIoT message including at least a PIoT relay command instructing the UE to communicate with the at least one PIoT device; and transmitting, based on the PIoT message, one or more signals to the at least one PIoT device in accordance with the configuration information.

Clause 2: The method of Clause 1, wherein the configuration information includes one or more parameters for communicating with the at least one PIoT device, the one or more parameters including at least one of: a type of deployment; a frequency range; a frequency reference point; a bandwidth part; a type of modulation; a number of payload bits for transmissions; an expected response time; a collision resolution mechanism; or an indication of a transmit power spectral mask.

Clause 3: The method of any one of Clauses 1-2, wherein receiving the configuration information comprises: receiving, in a system information block broadcast by the network entity, a first set of parameters for communicating with the at least one PIoT device, and receiving, in radio resource control (RRC) signaling from the network entity, a second set of parameters for communicating with the at least one PIoT device.

Clause 4: The method of Clause 3, wherein: the first set of parameters include at least one of a mandatory frequency band, a mandatory modulation scheme, or a mandatory transmit power for communicating with the at least one PIoT device, and the second set of parameters include at least one of an optional frequency band, an optional modulation scheme, or an optional transmit power for communicating with the at least one PIoT device.

Clause 5: The method of any one of Clauses 1-4, further comprising: transmitting UE capability information indicating that the UE supports PIoT communication, wherein receiving the configuration information is based on the UE capability information.

Clause 6: The method of Clause 5, further comprising: receiving, in system information broadcast by the network entity, an indication that the network entity supports PIoT communication, wherein transmitting the UE capability information is based on receiving the indication that the network entity supports the PIoT communication.

Clause 7: The method of any one of Clauses 5-6, further comprising: receiving, from the network entity, a query message requesting the UE to transmit the UE capability information, wherein transmitting the UE capability information is further based on the query message.

Clause 8: The method of any one of Clauses 5-7, further comprising: transmitting, to the network entity, a PIoT relay request message requesting to perform communication relaying with the at least one PIoT device, wherein receiving the PIoT relay command is based on the PIoT relay request message.

Clause 9: The method of Clause 8, wherein the PIoT relay command is received in at least one of a media access control-control element (MAC-CE), downlink control information (DCI), or radio resource control (RRC) signaling.

Clause 10: The method of any one of Clauses 8-9, further comprising: detecting the at least one PIoT device based on at least one of (i) a power associated with a PIoT bandwidth part (BWP) exceeding a threshold or (ii) decoding a message from the at least one PIoT device, wherein transmitting the PIoT relay request message is based on the detection of the at least one PIoT device.

Clause 11: The method of any one of Clauses 5-10, wherein the UE capability information further indicates at least one of: an indication that the UE supports at least one of layer 1, layer 2, or layer 3 relaying for communicating with the at least one PIoT device, transmission power support for at least one of multi-interrogator scenarios, dense interrogator scenarios, or both multi-interrogator scenarios and dense interrogator scenarios, a transmit power range for one or more PIoT channels, or one or more supported modulation schemes for communicating with the at least one PIoT device.

Clause 12: The method of any one of Clauses 1-11, wherein the PIoT message is received on at least one of a physical downlink control channel (PDCCH) or a physical downlink shared channel (PDSCH).

Clause 13: The method of any one of Clauses 1-12, wherein the one or more signals comprise at least one of: a continuous wave energy signal for powering the at least one PIoT device and one or more modulated data messages for the at least one PIoT device, or a continuous wave energy signal for powering only the at least one PIoT device.

Clause 14: The method of Clause 13, wherein the PIoT message includes an indication of a type of PIoT relaying to use for communicating with the at least one PIoT device, wherein the type of the PIoT relaying comprises one of layer 1 (L1) PIoT relaying, layer 2 (L2) PIoT relaying, or layer 3 (L3) PIoT relaying.

Clause 15: The method of Clause 14, wherein: the type of the PIoT relaying comprises L1 PIoT relaying, and based on the L1 PIoT relaying, the PIoT message includes an indication of at least one of a transmit power for transmitting the one or more signals to the at least one PIoT device, a duration for transmitting the one or more signals to the at least one PIoT device, or beam information for communicating with the at least one PIoT device.

Clause 16: The method of Clause 15, wherein: based on the L1 PIoT relaying, transmitting the one or more signals to the at least one PIoT device comprises: transmitting the continuous wave energy signal for powering the at least one PIoT device, and transmitting the one or more modulated data messages for the at least one PIoT device, and transmitting the one or more modulated data messages for the at least one PIoT device comprises relaying at least a portion of the PIoT message to the at least one PIoT device.

Clause 17: The method of Clause 14, wherein: the type of the PIoT relaying comprises L2 PIoT relaying or L3 PIoT relaying, and based on the L2 PIoT relaying or the L3 PIoT relaying, the PIoT message includes scheduling information, scheduling the UE to generate and transmit one or more PIoT command messages to the at least one PIoT device.

Clause 18: The method of Clause 17, wherein the one or more PIoT command messages comprise at least one of a select command, a query command, or an access command.

Clause 19: The method of any one of Clauses 17-18, wherein: based on the scheduling information, transmitting the one or more signals to the at least one PIoT device comprises: transmitting the continuous wave energy signal for powering the at least one PIoT device; and transmitting the one or more modulated data messages for the at least one PIoT device, the one or more modulated data messages comprising the one or more PIoT command messages.

Clause 20: The method of any one of Clauses 13-19, wherein the PIoT message indicates a time gap between reception or transmission of the PIoT message and transmission of the one or more signals.

Clause 21: The method of any one of Clauses 13-20, wherein the PIoT message indicates at least one of: a transmit power for transmitting the one or more signals to the at least one PIoT device, a channel index associated with a channel for transmitting the one or more signals to the at least one PIoT device, a data rate for transmitting the one or more signals to the at least one PIoT device, a data rate for receiving one or more signals from the at least one PIoT device, or a transmission scenario indicating one of a multi-interrogator scenario or a dense interrogator scenario.

Clause 22: The method of any one of Clauses 1-21, further comprising: receiving response information from the at least one PIoT device the one or more signals transmitted to the at least one PIoT device, and transmitting, to the network entity, the response information received from the at least one PIoT device.

Clause 23: A method for wireless communication by a network entity, comprising: outputting, for transmission to a user equipment (UE) in a wireless network, configuration information for communicating with at least one passive internet of things (PIoT) device; outputting, for transmission to the UE, a PIoT message, the PIoT message including at least a PIoT relay command instructing the UE to communicate with the at least one PIoT device; and obtaining response information from the at least one PIoT device based on the configuration information and the PIoT message.

Clause 24: The method of Clause 23, wherein the configuration information includes one or more parameters for communicating with the at least one PIoT device, the one or more parameters including at least one of: a type of deployment; a frequency range; a frequency reference point; a bandwidth part; a type of modulation; a number of payload bits for transmissions; an expected response time; a collision resolution mechanism; or an indication of a transmit power spectral mask.

Clause 25: The method of any one of Clauses 23-24, wherein outputting the configuration information for transmission to the UE comprises: outputting, for transmission to the UE in a system information block broadcast, a first set of parameters for communicating with the at least one PIoT device, and outputting, for transmission to the UE in radio resource control (RRC) signaling, a second set of parameters for communicating with the at least one PIoT device.

Clause 26: The method of Clause 25, wherein: the first set of parameters include at least one of a mandatory frequency band, a mandatory modulation scheme, or a mandatory transmit power for communicating with the at least one PIoT device, and the second set of parameters include at least one of an optional frequency band, an optional modulation scheme, or an optional transmit power for communicating with the at least one PIoT device.

Clause 27: The method of any one of Clauses 23-26, further comprising: obtaining UE capability information indicating that the UE supports PIoT communication, wherein outputting the configuration information for transmission to the UE is based on the UE capability information.

Clause 28: The method of Clause 27, further comprising: outputting, for transmission to the UE in system information broadcast, an indication that the network entity supports PIoT communication, wherein obtaining the UE capability information is based on the indication that the network entity supports the PIoT communication.

Clause 29: The method of any one of Clauses 27-28, further comprising: outputting, for transmission to the UE, a query message requesting the UE to transmit the UE capability information, wherein obtaining the UE capability information is further based on the query message.

Clause 30: The method of any one of Clauses 27-29, further comprising: obtaining, from the UE, a PIoT relay request message requesting to perform communication relaying with the at least one PIoT device, wherein outputting the PIoT message including the PIoT relay command is based on the PIoT relay request message.

Clause 31: The method of Clause 30, wherein the PIoT relay command is output for transmission in at least one of a media access control-control element (MAC-CE), downlink control information (DCI), or radio resource control (RRC) signaling.

Clause 32: The method of any one of Clauses 27-31, wherein the UE capability information further indicates at least one of: an indication that the UE supports at least one of layer 1, layer 2, or layer 3 relaying for communicating with the at least one PIoT device, transmission power support for at least one of multi-interrogator scenarios, dense interrogator scenarios, or both multi-interrogator scenarios and dense interrogator scenarios, a transmit power range for one or more PIoT channels, or one or more supported modulation schemes for communicating with the at least one PIoT device.

Clause 33: The method of any one of Clauses 23-32, wherein the PIoT message is output for transmission on at least one of a physical downlink control channel (PDCCH) or a physical downlink shared channel (PDSCH).

Clause 34: The method of any one of Clauses 23-33, wherein the PIoT message includes scheduling information for scheduling the UE to transmit one or more signals to the at least one PIoT device, the one or more signals comprising at least one of: a continuous wave energy signal for powering the at least one PIoT device and one or more modulated data messages for the at least one PIoT device, or a continuous wave energy signal for powering only the at least one PIoT device.

Clause 35: The method of Clause 34, wherein the PIoT message indicates a time gap between reception or transmission of the PIoT message and transmission of the one or more signals.

Clause 36: The method of any one of Clauses 34-35, wherein the PIoT message indicates at least one of: a transmit power for transmitting one or more signals to the at least one PIoT device, a channel index associated with a channel for transmitting one or more signals to the at least one PIoT device, a data rate for transmitting one or more signals to the at least one PIoT device, a data rate for receiving one or more signals from the at least one PIoT device, or a transmission scenario indicating one of a multi-interrogator scenario or a dense interrogator scenario.

Clause 37: The method of any one of Clauses 34-36, wherein the scheduling information schedules the UE to transmit the continuous wave energy signal for powering only the at least one PIoT device.

Clause 38: The method of Clause 37, further comprising outputting, for transmission to the at least one PIoT device, one or more PIoT command messages to the at least one PIoT device, wherein: the one or more PIoT command messages comprise at least one of a select command, a query command, or an access command, and the response information is obtained directly from the at least one PIoT device.

Clause 39: The method of any one of Clauses 34-36, wherein the scheduling information schedules the UE to transmit the continuous wave energy signal for powering the at least one PIoT device and the one or more modulated data messages for the at least one PIoT device.

Clause 40: The method of Clause 39, wherein the response information is obtained indirectly from the at least one PIoT device via the UE.

Clause 41: The method of any one of Clauses 23-36 or 39-40, wherein the PIoT message includes an indication of a type of PIoT relaying to use for communicating with the at least one PIoT device, wherein the type of the PIoT relaying comprises one of layer 1 (L1) PIoT relaying, layer 2 (L2) PIoT relaying, or layer 3 (L3) PIoT relaying.

Clause 42: The method of Clause 41, wherein: the type of the PIoT relaying comprises L1 PIoT relaying, and based on the L1 PIoT relaying, the PIoT message includes an indication of at least one of a transmit power for transmitting one or more signals to the at least one PIoT device, a duration for transmitting one or more signals to the at least one PIoT device, or beam information for communicating with the at least one PIoT device.

Clause 43: The method of Clause 41, wherein: the type of the PIoT relaying comprises L2 PIoT relaying or L3 PIoT relaying, and based on the L2 PIoT relaying or the L3 PIoT relaying, the PIoT message includes scheduling information scheduling the UE to transmit one or more PIoT command messages to the at least one PIoT device.

Clause 44: The method of Clause 43, wherein the one or more PIoT command messages comprise at least one of a select command, a query command, or an access command.

Clause 45: An apparatus, comprising: a memory comprising executable instructions; and a processor configured to execute the executable instructions and cause the apparatus to perform a method in accordance with any one of Clauses 1-44.

Clause 46: An apparatus, comprising means for performing a method in accordance with any one of Clauses 1-44.

Clause 47: A non-transitory computer-readable medium comprising executable instructions that, when executed by a processor of an apparatus, cause the apparatus to perform a method in accordance with any one of Clauses 1-44.

Clause 48: A computer program product embodied on a computer-readable storage medium comprising code for performing a method in accordance with any one of Clauses 1-44.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
   one or more memories comprising executable instructions; and
   one or more processors configured to execute the executable instructions and cause the apparatus to:
   receive, from a network entity in a wireless network, configuration information for communication with at least one passive internet of things (PIoT) device;
   receive, from the network entity, a PIoT message, the PIoT message including at least a PIoT relay command instructing a user equipment (UE) to communicate with the at least one PIoT device; and transmit, based on the PIoT message, one or more signals to the at least one PIoT device in accordance with the configuration information,
wherein the one or more signals comprise at least one of:
a continuous wave energy signal for powering the at least one PIoT device and one or more modulated data messages for the at least one PIoT device, or
a continuous wave energy signal for powering only the at least one PIoT device.

2. The apparatus of claim 1, wherein the configuration information includes one or more parameters for communication with the at least one PIoT device, the one or more parameters including at least one of:
a type of deployment;
a frequency range;
a frequency reference point;
a bandwidth part;
a type of modulation;
a number of payload bits for transmissions;
an expected response time;
a collision resolution mechanism; or
an indication of a transmit power spectral mask.

3. The apparatus of claim 1, wherein:
wherein to receive the configuration information, the one or more processors are configured to execute the executable instructions and cause the apparatus to:
receive, in a system information block broadcast by the network entity, a first set of parameters for communication with the at least one PIoT device, and
receive, in radio resource control (RRC) signaling from the network entity, a second set of parameters for communication with the at least one PIoT device,
wherein the first set of parameters includes at least one of a mandatory frequency band, a mandatory modulation scheme, or a mandatory transmit power for communication with the at least one PIoT device, and
wherein the second set of parameters includes at least one of an optional frequency band, an optional modulation scheme, or an optional transmit power for communication with the at least one PIoT device.

4. The apparatus of claim 1, wherein the one or more processors are configured to execute the executable instructions and cause the apparatus to:
transmit UE capability information indicating that the UE supports PIoT communication,
receive the configuration information after transmission of the UE capability information.

5. The apparatus of claim 4, wherein the one or more processors are configured to execute the executable instructions and cause the apparatus to:
receive, in system information broadcast by the network entity, an indication that the network entity supports PIoT communication, wherein transmission of the UE capability information is based on reception of the indication that the network entity supports the PIoT communication; or
receive, from the network entity, a query message requesting the UE to transmit the UE capability information, wherein transmission of transmit the UE capability information is further based on the query message.

6. The apparatus of claim 4, wherein the one or more processors are configured to execute the executable instructions and cause the apparatus to:
detect the at least one PIoT device based on at least one of (i) a power associated with a PIoT bandwidth part (BWP) exceeding a threshold or (ii) decoding a message from the at least one PIoT device;
transmit, to the network entity, a PIoT relay request message requesting to perform communication relaying with the at least one PIoT device based on the detection of the at least one PIoT device; and
receive the PIoT relay command based on the PIoT relay request message.

7. The apparatus of claim 4, wherein the UE capability information further indicates at least one of:
an indication that the UE supports at least one of layer 1, layer 2, or layer 3 relaying for communication with the at least one PIoT device,
transmission power support for at least one of multi-interrogator scenarios, dense interrogator scenarios, or both multi-interrogator scenarios and dense interrogator scenarios,
a transmit power range for one or more PIoT channels, or
one or more supported modulation schemes for communication with the at least one PIoT device.

8. The apparatus of claim 1, wherein the PIoT message includes an indication of a type of PIoT relaying to use for communicating with the at least one PIoT device, wherein the type of the PIoT relaying comprises one of layer 1 (L1) PIoT relaying, layer 2 (L2) PIoT relaying, or layer 3 (L3) PIoT relaying.

9. The apparatus of claim 8, wherein:
wherein the type of the PIoT relaying comprises L1 PIoT relaying,
wherein based on the L1 PIoT relaying, the PIoT message includes an indication of at least one of a transmit power for transmission of transmit the one or more signals to the at least one PIoT device, a duration for transmission of transmit the one or more signals to the at least one PIoT device, or beam information for communication with the at least one PIoT device,
wherein based on the L1 PIoT relaying, the one or more processors are configured to execute the executable instructions and cause the apparatus to transmit the one or more signals to the at least one PIoT device,
wherein to transmit the one or more signals to the at least one PIoT device, the one or more processors are configured to execute the executable instructions and cause the apparatus to:
transmit the continuous wave energy signal for powering the at least one PIoT device, and
transmit the one or more modulated data messages for the at least one PIoT device by relaying at least a portion of the PIoT message to the at least one PIoT device.

10. The apparatus of claim 8, wherein:
wherein the type of the PIoT relaying comprises L2 PIoT relaying or L3 PIoT relaying,
wherein based on the L2 PIoT relaying or the L3 PIoT relaying, the PIoT message includes scheduling information configured to schedule the UE to generate and transmit one or more PIoT command messages to the at least one PIoT device, and
wherein based on the scheduling information, to transmit the one or more signals to the at least one PIoT device, the one or more processors are configured to execute the executable instructions and cause the apparatus to:
transmit the continuous wave energy signal for powering the at least one PIoT device; and
transmit the one or more modulated data messages for the at least one PIoT device, the one or more modulated data messages comprising the one or more PIoT command messages.

11. The apparatus of claim 1, wherein the PIoT message indicates a time gap between reception or transmission of the PIoT message and transmission of the one or more signals.

12. The apparatus of claim 1, wherein the PIoT message indicates at least one of:
 a transmit power for transmission of transmit the one or more signals to the at least one PIoT device,
 a channel index associated with a channel for transmission of transmit the one or more signals to the at least one PIoT device,
 a data rate for transmission of transmit the one or more signals to the at least one PIoT device,
 a data rate for reception of one or more signals from the at least one PIoT device, or
 a transmission scenario indicating one of a multi-interrogator scenario or a dense interrogator scenario.

13. The apparatus of claim 1, wherein the one or more processors are configured to execute the executable instructions and cause the apparatus to:
 receive response information from the at least one PIoT device after the transmission of the one or more signals to the at least one PIoT device, and
 transmit, to the network entity, the response information received from the at least one PIoT device.

14. An apparatus for wireless communication, comprising:
 one or more memories comprising executable instructions; and
 one or more processors configured to execute the executable instructions and cause the apparatus to:
  output, for transmission to a user equipment (UE) in a wireless network, configuration information for communication with at least one passive internet of things (PIoT) device;
  output, for transmission to the UE, a PIoT message, the PIoT message including at least a PIoT relay command instructing the UE to communicate with the at least one PIoT device; and
  obtain response information from the at least one PIoT device based on the PIoT message,
  wherein the PIoT message includes scheduling information configured to schedule the UE to transmit one or more signals to the at least one PIoT device, the one or more signals comprising at least one of:
   a continuous wave energy signal for powering the at least one PIoT device and one or more modulated data messages for the at least one PIoT device, or
   a continuous wave energy signal for powering only the at least one PIoT device.

15. The apparatus of claim 14, wherein the configuration information includes one or more parameters for communication with the at least one PIoT device, the one or more parameters including at least one of:
 a type of deployment;
 a frequency range;
 a frequency reference point;
 a bandwidth part;
 a type of modulation;
 a number of payload bits for transmissions;
 an expected response time;
 a collision resolution mechanism; or
 an indication of a transmit power spectral mask.

16. The apparatus of claim 14,
 wherein to output the configuration information for transmission to the UE, the one or more processors are configured to execute the executable instructions and cause the apparatus to comprises:
  output, for transmission to the UE in a system information block broadcast, a first set of parameters for communication with the at least one PIoT device, and
  output, for transmission to the UE in radio resource control (RRC) signaling, a second set of parameters for communication with the at least one PIoT device,
 wherein the first set of parameters include at least one of a mandatory frequency band, a mandatory modulation scheme, or a mandatory transmit power for communication with the at least one PIoT device, and
 wherein the second set of parameters include at least one of an optional frequency band, an optional modulation scheme, or an optional transmit power for communication with the at least one PIoT device.

17. The apparatus of claim 14, wherein the one or more processors are configured to execute the executable instructions and cause the apparatus to:
 obtain UE capability information indicating that the UE supports PIoT communication,
 output the configuration information for transmission to the UE based on the UE capability information.

18. The apparatus of claim 17, wherein the one or more processors are configured to execute the executable instructions and cause the apparatus to:
 (i) output, for transmission to the UE in system information broadcast, an indication that a network entity supports PIoT communication, and obtain the UE capability information is based on the indication that the network entity supports the PIoT communication; or
 (ii) output, for transmission to the UE, a query message that requests the UE to transmit the UE capability information, and wherein obtain the UE capability information based on the query message.

19. The apparatus of claim 17, wherein the one or more processors are configured to execute the executable instructions and cause the apparatus to:
 obtain, from the UE, a PIoT relay request message that requests to perform communication relaying with the at least one PIoT device; and
 output the PIoT message including the PIoT relay command based on the PIoT relay request message.

20. The apparatus of claim 17, wherein the UE capability information further indicates at least one of:
 an indication that the UE supports at least one of layer 1, layer 2, or layer 3 relaying for communication with the at least one PIoT device,
 transmission power support for at least one of multi-interrogator scenarios, dense interrogator scenarios, or both multi-interrogator scenarios and dense interrogator scenarios,
 a transmit power range for one or more PIoT channels, or
 one or more supported modulation schemes for communication with the at least one PIoT device.

21. The apparatus method of claim 14, wherein:
 the scheduling information is configured to schedules the UE to transmit the continuous wave energy signal for powering only the at least one PIoT device, and
 the one or more processors are configured to execute the executable instructions and cause the apparatus to output, for transmission to the at least one PIoT device, one or more PIoT command messages to the at least one PIoT device, the one or more PIoT command messages comprise at least one of a select command, a query command, or an access command, and the one or more processors are configured to execute the executable instructions and cause the apparatus to obtain the response information directly from the at least one PIoT device.

22. The apparatus method of claim 14, wherein:

the scheduling information is configured to schedule the UE to transmit the continuous wave energy signal for powering the at least one PIoT device and the one or more modulated data messages for the at least one PIoT device, and the one or more processors are configured to execute the executable instructions and cause the apparatus to obtain the response information indirectly from the at least one PIoT device via the UE.

23. The apparatus method of claim 14, wherein: the PIoT message indicates a time gap between reception or transmission of the PIoT message and transmission of the one or more signals.

24. The apparatus method of claim 14, wherein: the PIoT message indicates at least one of:

a transmit power for transmission of transmit one or more signals to the at least one PIoT device, a channel index associated with a channel for transmission of transmit one or more signals to the at least one PIoT device, a data rate for transmission of transmit one or more signals to the at least one PIoT device, a data rate for reception of one or more signals from the at least one PIoT device, or a transmission scenario indicating one of a multi-interrogator scenario or a dense interrogator scenario.

25. The apparatus of claim 14, wherein the PIoT message includes an indication of a type of PIoT relaying to use for communication with the at least one PIoT device, wherein the type of the PIoT relaying comprises one of layer 1 (L1) PIoT relaying, layer 2 (L2) PIoT relaying, or layer 3 (L3) PIoT relaying.

26. The apparatus of claim 25, wherein one of:

the type of the PIoT relaying comprises L1 PIoT relaying and based on the L1 PIoT relaying, the PIoT message includes an indication of at least one of a transmit power for transmission of transmit one or more signals to the at least one PIoT device, a duration for transmission of transmit one or more signals to the at least one PIoT device, or beam information for communication with the at least one PIoT device, or the type of the PIoT relaying comprises L2 PIoT relaying or L3 PIoT relaying and based on the L2 PIoT relaying or the L3 PIoT relaying, the PIoT message includes scheduling information scheduling the UE to transmit one or more PIoT command messages to the at least one PIoT device.

27. An apparatus for wireless communication, comprising:

one or more memories comprising executable instructions; and one or more processors configured to execute the executable instructions and cause the apparatus to:

transmit UE capability information indicating that the UE supports PIoT communication;

receive, after transmission of the UE capability information and from a network entity in a wireless network, configuration information for communication with at least one passive internet of things (PIoT) device;

receive, from the network entity, a PIoT message, the PIoT message including at least a PIoT relay command instructing a user equipment (UE) to communicate with the at least one PIoT device; and transmit, based on the PIoT message, one or more signals to the at least one PIoT device in accordance with the configuration information, wherein:

(a) the one or more processors are configured to execute the executable instructions and cause the apparatus to:

detect the at least one PIoT device based on at least one of (i) a power associated with a PIoT bandwidth part (BWP) exceeding a threshold or (ii) decoding a message from the at least one PIoT device, transmit, to the network entity, a PIoT relay request message requesting to perform communication relaying with the at least one PIoT device based on the detection of the at least one PIoT device, and receive the PIoT relay command based on the PIoT relay request message; or (b) the UE capability information further indicates at least one of:

an indication that the UE supports at least one of layer 1, layer 2, or layer 3 relaying for communication with the at least one PIoT device, transmission power support for at least one of multi-interrogator scenarios, dense interrogator scenarios, or both multi-interrogator scenarios and dense interrogator scenarios, a transmit power range for one or more PIoT channels; or one or more supported modulation schemes for communication with the at least one PIoT device.

28. The apparatus of claim 27, wherein the one or more processors are configured to execute the executable instructions and cause the apparatus to:

detect the at least one PIoT device based on at least one of (i) the power associated with the PIoT bandwidth part (BWP) exceeding the threshold or (ii) decoding the message from the at least one PIoT device;

transmit, to the network entity, the PIoT relay request message requesting to perform communication relaying with the at least one PIoT device based on the detection of the at least one PIoT device; and receive the PIoT relay command based on the PIoT relay request message.

29. The apparatus of claim 27, wherein the UE capability information further indicates at least one of:

the indication that the UE supports at least one of layer 1, layer 2, or layer 3 relaying for communication with the at least one PIoT device, the transmission power support for at least one of multi-interrogator scenarios, dense interrogator scenarios, or both multi-interrogator scenarios and dense interrogator scenarios, the transmit power range for one or more PIoT channels, or the one or more supported modulation schemes for communication with the at least one PIoT device.

30. An apparatus for wireless communication, comprising:
one or more memories comprising executable instructions; and
one or more processors configured to execute the executable instructions and cause the apparatus to:
obtain UE capability information indicating that a user equipment (UE) supports PIoT communication,
output, based on the UE capability information and for transmission to the UE, configuration information for communication with at least one passive internet of things (PIoT) device;
output, for transmission to the UE, a PIoT message, the PIoT message including at least a PIoT relay command instructing the UE to communicate with the at least one PIoT device; and
obtain response information from the at least one PIoT device based on the PIoT message,
wherein:
(a) the one or more processors are configured to execute the executable instructions and cause the apparatus to:
obtain, from the UE, a PIoT relay request message that requests to perform communication relaying with the at least one PIoT device, and
output the PIoT message including the PIoT relay command based on the PIoT relay request message; or
(b) the UE capability information further indicates at least one of:
an indication that the UE supports at least one of layer 1, layer 2, or layer 3 relaying for communication with the at least one PIoT device,
transmission power support for at least one of multi-interrogator scenarios, dense interrogator scenarios, or both multi-interrogator scenarios and dense interrogator scenarios,
a transmit power range for one or more PIoT channels, or
one or more supported modulation schemes for communication with the at least one PIoT device.

31. The apparatus of claim 30, wherein the one or more processors are configured to execute the executable instructions and cause the apparatus to:
obtain, from the UE, the PIoT relay request message that requests to perform communication relaying with the at least one PIoT device; and
output the PIoT message including the PIoT relay command based on the PIoT relay request message.

32. The apparatus of claim 30, wherein the UE capability information further indicates at least one of:
the indication that the UE supports at least one of layer 1, layer 2, or layer 3 relaying for communication with the at least one PIoT device,
the transmission power support for at least one of multi-interrogator scenarios, dense interrogator scenarios, or both multi-interrogator scenarios and dense interrogator scenarios,
the transmit power range for one or more PIoT channels, or
the one or more supported modulation schemes for communication with the at least one PIoT device.

* * * * *